(12) United States Patent
Tsukamoto et al.

(10) Patent No.: US 10,190,452 B2
(45) Date of Patent: Jan. 29, 2019

(54) ENGINE LUBRICATION STRUCTURE AND MOTORCYCLE

(71) Applicant: SUZUKI MOTOR CORPORATION, Hamamatsu-shi, Shizuoka (JP)

(72) Inventors: Kohei Tsukamoto, Hamamatsu (JP); Shintaro Yagi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 44 days.

(21) Appl. No.: 15/335,143

(22) Filed: Oct. 26, 2016

(65) Prior Publication Data
US 2017/0114681 A1   Apr. 27, 2017

(30) Foreign Application Priority Data

Oct. 27, 2015   (JP) .................. 2015-210359
Oct. 27, 2015   (JP) .................. 2015-210363

(51) Int. Cl.
| | |
|---|---|
| *F01M 1/06* | (2006.01) |
| *F01M 1/08* | (2006.01) |
| *F02B 39/14* | (2006.01) |
| *F02B 61/02* | (2006.01) |
| *F16F 15/26* | (2006.01) |
| *F01M 11/02* | (2006.01) |

(52) U.S. Cl.
CPC ............... *F01M 1/06* (2013.01); *F01M 1/08* (2013.01); *F01M 11/02* (2013.01); *F02B 39/14* (2013.01); *F02B 61/02* (2013.01); *F16F 15/264* (2013.01); *F01M 2001/062* (2013.01); *F01M 2001/068* (2013.01); *F01M 2001/083* (2013.01); *F01M 2011/021* (2013.01); *F01M 2011/026* (2013.01); *F01M 2011/028* (2013.01)

(58) Field of Classification Search
CPC . F01M 1/06; F01M 11/02; F01M 1/08; F01M 2011/026; F01M 2011/021; F01M 2011/028; F01M 2001/083; F01M 2001/068; F01M 2001/062; F02B 39/14; F02B 61/02; F16F 15/264
See application file for complete search history.

(56) References Cited

U.S. PATENT DOCUMENTS

| | | | | |
|---|---|---|---|---|
| 6,257,192 B1* | 7/2001 | Yamaura | ............... | F01M 1/06 |
| | | | | 123/196 R |
| 2002/0083914 A1* | 7/2002 | Fegg | ............... | F01M 1/02 |
| | | | | 123/196 R |
| 2006/0068656 A1* | 3/2006 | Hoi | ............... | B63B 35/731 |
| | | | | 440/88 L |

FOREIGN PATENT DOCUMENTS

| | | |
|---|---|---|
| JP | 61-47436 U | 3/1986 |
| JP | 4-107543 U | 9/1992 |
| JP | 2013083194 A * | 5/2013 |

* cited by examiner

*Primary Examiner* — Jacob Amick
*Assistant Examiner* — Charles Brauch
(74) *Attorney, Agent, or Firm* — Stein IP, LLC

(57) ABSTRACT

An engine lubrication structure supplies oil from an oil pump to individual components of an engine in which a balancer shaft is disposed parallel with a crank shaft in a crank case, the engine includes a turbocharger which compresses intake air using exhaust gas of the engine; a main gallery which supplies oil to a bearing of the crank shaft and a bearing of the balancer shaft and a sub-gallery which supplies, to individual components of the engine, oil that has been supplied to the bearing of the balancer shaft are provided in the crank case; and an oil passage which supplies oil to the turbocharger is connected to the sub-gallery.

5 Claims, 16 Drawing Sheets

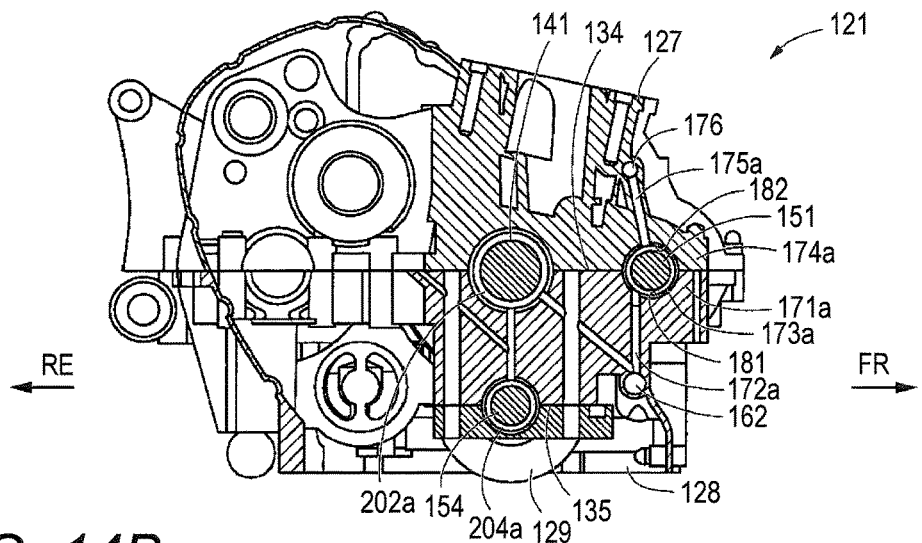

FIG. 16
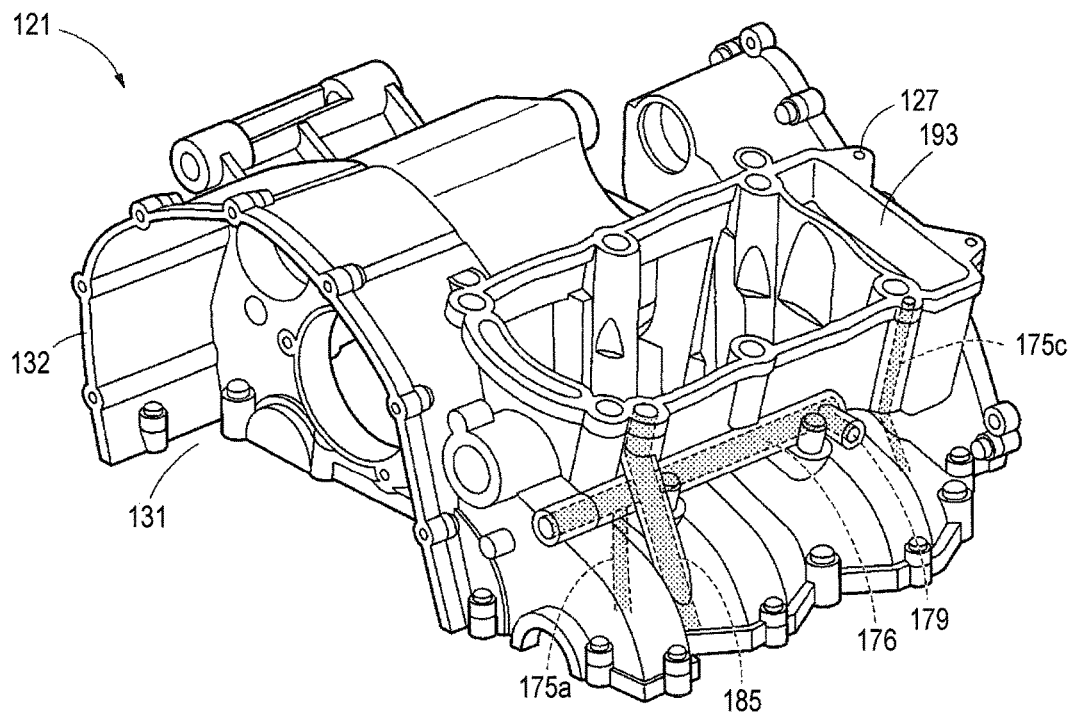
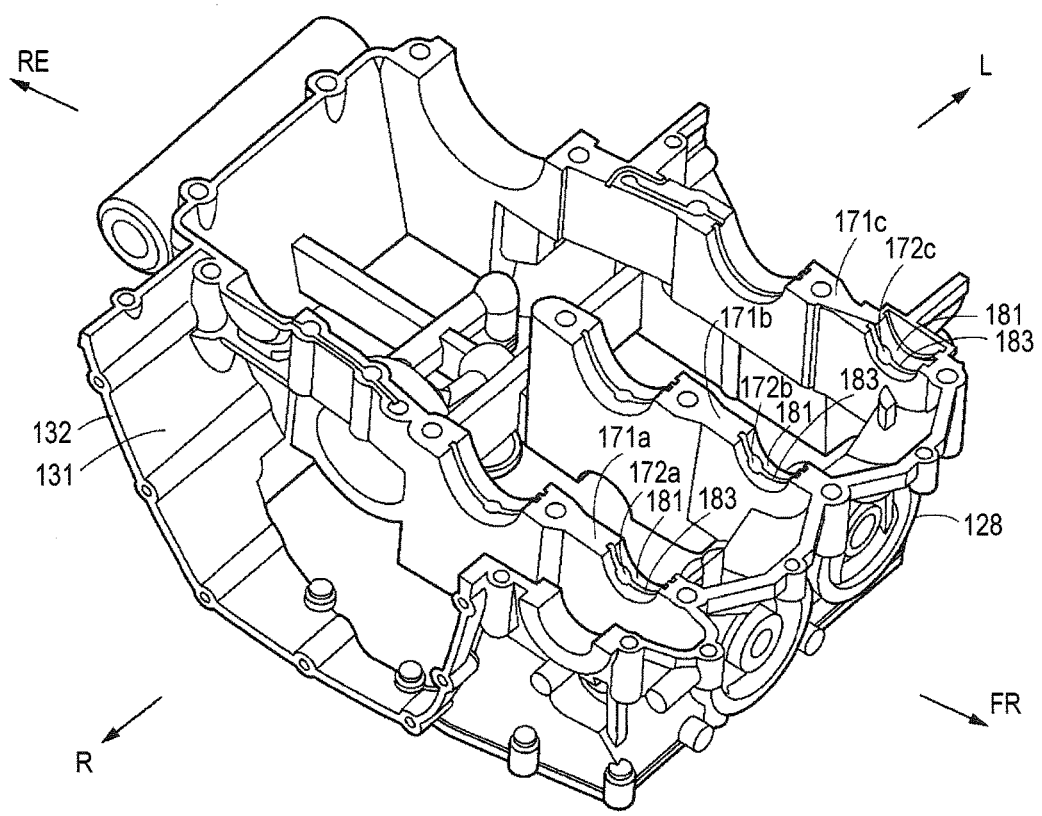

ENGINE LUBRICATION STRUCTURE AND MOTORCYCLE

CROSS-REFERENCE TO RELATED APPLICATIONS

This application claims the benefit of Japanese Patent Application JP 2015-210359, filed Oct. 27, 2015, and Japanese Patent Application JP 2015-210363, filed Oct. 27, 2015, the entire contents of which are hereby incorporated by reference, the same as if set forth at length.

FIELD OF THE INVENTION

The present invention relates to a lubrication structure of an engine having a turbocharger, an engine lubrication structure for supplying oil to individual components of an engine, and a motorcycle having one of such engine lubrication structures.

BACKGROUND OF THE INVENTION

Among motorcycles having a supercharger are ones having a turbocharger which uses an engine exhaust gas as a drive source of the turbocharger. In such motorcycles, an exhaust manifold is attached to exhaust ports of a cylinder head and the turbocharger is attached to the exhaust manifold.

Usually, turbochargers are lubricated properly by supplying part of oil that circulates the engine to a drive portion of the turbocharger (refer to JP-UM-A-61-47436, for example). JP-UM-A-61-47436 discloses a turbocharger lubrication structure in which oil that is pumped up from an oil pan is supplied to a main gallery via an oil cooler and an oil filter. Oil is supplied to the turbocharger from a passage that branches off from an oil passage located upstream of the oil cooler.

In engine lubrication structures in general, oil is pumped up from an oil pan by an oil pump and supplied to individual components of the engine via an oil passage that branches off from a main gallery. Among such engine lubrication structures are ones in which oil is supplied from a main gallery directly to shaft bearings where high oil pressure is necessary (refer to JP-UM-A-4-107543, for example). JP-UM-A-4-107543 discloses an engine having a 2-axis balancer structure in which balancer shafts are disposed in front of and in the rear of a crank shaft. Oil passages to the bearings of the front and rear balancers and the bearings of various transmission shafts branch off from a main gallery where the oil pressure is high.

SUMMARY OF THE INVENTION

In JP-UM-A-61-47436, pumped-up oil is supplied directly to the turbocharger without passing the oil cooler or the oil filter. This may cause a problem that oil that reaches the main gallery via the oil cooler and the oil filter is not given a sufficiently high pressure and only an insufficient amount of oil is supplied to individual shafts in the engine from the main gallery.

The present invention has been made in view of the above, and an object of the invention is therefore to provide an engine lubrication structure capable of supplying oil to individual shafts in the engine properly while lubricating a turbocharger, as well as a motorcycle using it.

In the engine lubrication structure disclosed in JP-UM-A-4-107543, since the oil passages to the bearings of the respective shafts branch off individually from the main gallery, high-pressure oil is supplied to the bearing of each shaft. However, high-pressure oil that has been used for lubrication of the bearing of each shaft is returned directly to the oil pan and hence is not used effectively. Furthermore, the oil passages are not formed in a well-organized manner except part of them, the installation of new pipes cause increase in weight and the number of machining steps and the elongation of oil passages causes slight reduction in oil pressure.

The invention has been made also in view of the above, and another object of the invention is therefore to provide an engine lubrication structure capable of shortening oil passages without causing increase in weight or the number of machining steps and enabling effective use of high-pressure oil that is supplied from a main gallery, as well as a motorcycle using it.

A first aspect of the invention provides an engine lubrication structure which supplies oil from an oil pump to individual components of an engine in which a balancer shaft is disposed parallel with a crank shaft in a crank case, characterized in that the engine has a turbocharger which compresses intake air using exhaust gas of the engine; that a main gallery which supplies oil to a bearing of the crank shaft and a bearing of the balancer shaft and a sub-gallery which supplies, to individual components of the engine, oil that has been supplied to the bearing of the balancer shaft are formed in the crank case; and that an oil passage which supplies oil to the turbocharger is connected to the sub-gallery.

With this configuration, high-pressure oil is supplied from the oil pump to the main gallery and high-pressure oil is also supplied from the main gallery to the bearing of the balancer shaft. Furthermore, oil is supplied from the bearing of the balancer shaft to the other shafts and the turbocharger via the sub-gallery and the oil passages. Thus, high-pressure oil can be used effectively. Since the oil passage that leads to the turbocharger is connected to the sub-gallery, the turbocharger can be lubricated while oil is supplied to the shafts properly. Since the same oil passages are used for supplying oil to the bearing of the balancer shaft and the sub-gallery, no independent oil passages for these purposes need to be formed in the crank case. As a result, no independent pipes need to be provided, the weight or the number of machining steps is not increased, and the oil passages can be shortened.

In the engine lubrication structure according to the first aspect of the invention, it is preferable that the sub-gallery be provided with a piston jet which jets oil toward a piston. With this configuration, since oil that has passed the bearing of the balancer shaft has a high pressure, the oil can used again for cooling of the piston by supplying the oil to the piston jet from the sub-gallery.

In the engine lubrication structure according to the first aspect of the invention, it is preferable that the balancer shaft be disposed below the sub-gallery, and that the main gallery be disposed below the balancer shaft. With this configuration, the oil passage from the main gallery to the balancer shaft and the oil passage from the balancer shaft to the sub-gallery can be formed straightly, whereby these oil passages can be made short to suppress oil pressure reduction.

In the engine lubrication structure according to the first aspect of the invention, it is preferable that an oil return passage which returns oil that has been supplied to the turbocharger to the crank case be connected to the crank case, that the balancer shaft be disposed in front of the crank shaft, and that the oil return passage be connected to a wall of a balancer room which houses the balancer shaft. With this configuration in which the oil return passage is connected to the wall of the balancer room, when oil that has been used for lubrication of the inside of the turbocharger is returned to inside the crank case, the oil flows down the wall surface of the balancer room. As a result, the oil is not agitated and hence oil scattering and generation of air bubbles can be suppressed.

The first aspect of the invention also provides a motorcycle characterized by comprising the engine lubrication structure according to the first aspect of the invention.

The first aspect of the invention makes it possible to supply oil to the individual shafts in the engine properly while lubricating the turbocharger.

A second aspect of the invention provides an engine lubrication structure which supplies oil from an oil pump to individual components of an engine in which a balancer shaft is disposed parallel with a crank shaft in a crank case, characterized in that a main gallery which is supplied with oil from the oil pump, an oil passage which causes oil coming from the main gallery to flow through itself and pass a bearing of the balancer shaft, and a sub-gallery which supplies, to individual components of the engine, oil that has passed the bearing of the balancer shaft are formed in the crank case.

With this configuration, high-pressure oil is supplied from the oil pump to the main gallery and high-pressure oil is also supplied from the main gallery to the bearing of the balancer shaft. As a result, the balancer shaft is supported by the bearing rotatably via an oil film, whereby seizing-up of the balancer shaft can be prevented. Since high-pressure oil is supplied to the sub-gallery via the bearing of the balancer shaft, the oil coming from the sub-gallery can be reused for lubrication of several components of the engine. Furthermore, since the same oil passage is used for supplying oil from the main gallery to the bearing of the balancer shaft and the sub-gallery, no independent oil passages for these purposes need to be formed in the crank case. As a result, no independent pipes need to be provided, the weight or the number of machining steps is not increased, and the oil passages can be shortened.

In the engine lubrication structure according to the second aspect of the invention, it is preferable that that the main gallery be disposed below the balancer shaft, and that the sub-gallery be formed above the balancer shaft parallel with the main gallery. With this configuration, oil can be supplied from the main gallery which is located below the balancer shaft to the sub-gallery which is located above the balancer shaft via the bearing of the balancer shaft. Since the main gallery and the sub-gallery are parallel with each other, the regions where these galleries are formed in the crank case can be made small and the crank case can be miniaturized accordingly.

In the engine lubrication structure according to the second aspect of the invention, it is preferable that the crank case be dividable in the vertical direction and have a top case and a bottom case, that the main gallery be formed in the bottom case, that the sub-gallery be formed in the top case, and that the bearing of the balancer shaft be disposed at a joining plane of the top case and the bottom case. With this configuration, even if oil leakage occurs at the bearing placement position, the oil is returned to inside the crank case. Since no sealing member for preventing oil leakage is necessary, the number of components can be reduced.

In the engine lubrication structure according to the second aspect of the invention, it is preferable that the balancer shaft be disposed on a straight line that connects the main gallery and the sub-gallery in the crank case. With this configuration, the oil passages can be shortened and oil pressure reduction can be suppressed.

In the engine lubrication structure according to the second aspect of the invention, it is preferable that the sub-gallery supply the oil that has passed the bearing of the balancer shaft to a piston jet which serves to cool a piston. With this configuration, since the oil that has passed the bearing of the balancer shaft has a high pressure, the oil can be reused for cooling of the piston by supplying it to the piston jet from the sub-gallery.

In the engine lubrication structure according to the second aspect of the invention, it is preferable that a lubrication path from the main gallery to the sub-gallery and a lubrication path from the main gallery to a bearing of the crank shaft be different from each other. With this configuration, the influence of oil pressure reduction in the sub-gallery on the oil pressure at the bearing of the crank shaft can be lessened.

In the engine lubrication structure according to the second aspect of the invention, it is preferable that the abovementioned oil passage be formed on one of the left side and the right side in the crank case, and another oil passage that supplies oil from the main gallery to a cylinder head be formed on the other side. With this configuration, the oil pressure in the main gallery can be distributed equally to the left side and the right side. Furthermore, since the sets of oil passages are distant from each other in the left-right direction, oil pressure reduction in the sub-gallery does not affect the oil pressure in the cylinder head.

In the engine lubrication structure according to the second aspect of the invention, it is preferable that the balancer shaft be a front balancer shaft which is disposed in front of the crank shaft and a bottom balancer shaft be disposed below the crank shaft, and that the main gallery be formed in front of the bottom balancer shaft in the crank case. With this configuration, the front-rear width of the crank case can be made shorter than in a case that balancer shafts are disposed in front of and in the rear of a crank shaft in a crank case. Furthermore, the bottom balancer shaft does not interfere with the main gallery in their arrangement.

The second aspect of the invention also provides a motorcycle characterized by comprising the engine lubrication structure according to the second aspect of the invention. With this configuration, high-pressure oil can be supplied to individual components of the engine of the motorcycle and can be utilized there effectively.

According to the second aspect of the invention, since oil is supplied from the main gallery to the sub-gallery via the bearing of the balancer shaft, high-pressure oil coming from the sub-gallery can be reused for lubrication of several components of the engine. Furthermore, since the same oil passage is used for supplying oil from the main gallery to the bearing of the balancer shaft and the sub-gallery, no independent pipes need to be provided and the oil passages can be shortened.

BRIEF DESCRIPTION OF THE DRAWINGS

FIGS. 14A, 14B and 14C are sectional views of the crank case according to the embodiment of the second aspect of the invention.

FIG. 16 is a perspective view of a top case and a bottom case of the crank case according to the embodiment of the second aspect of the invention.

DESCRIPTION OF SYMBOLS

Figure 1:
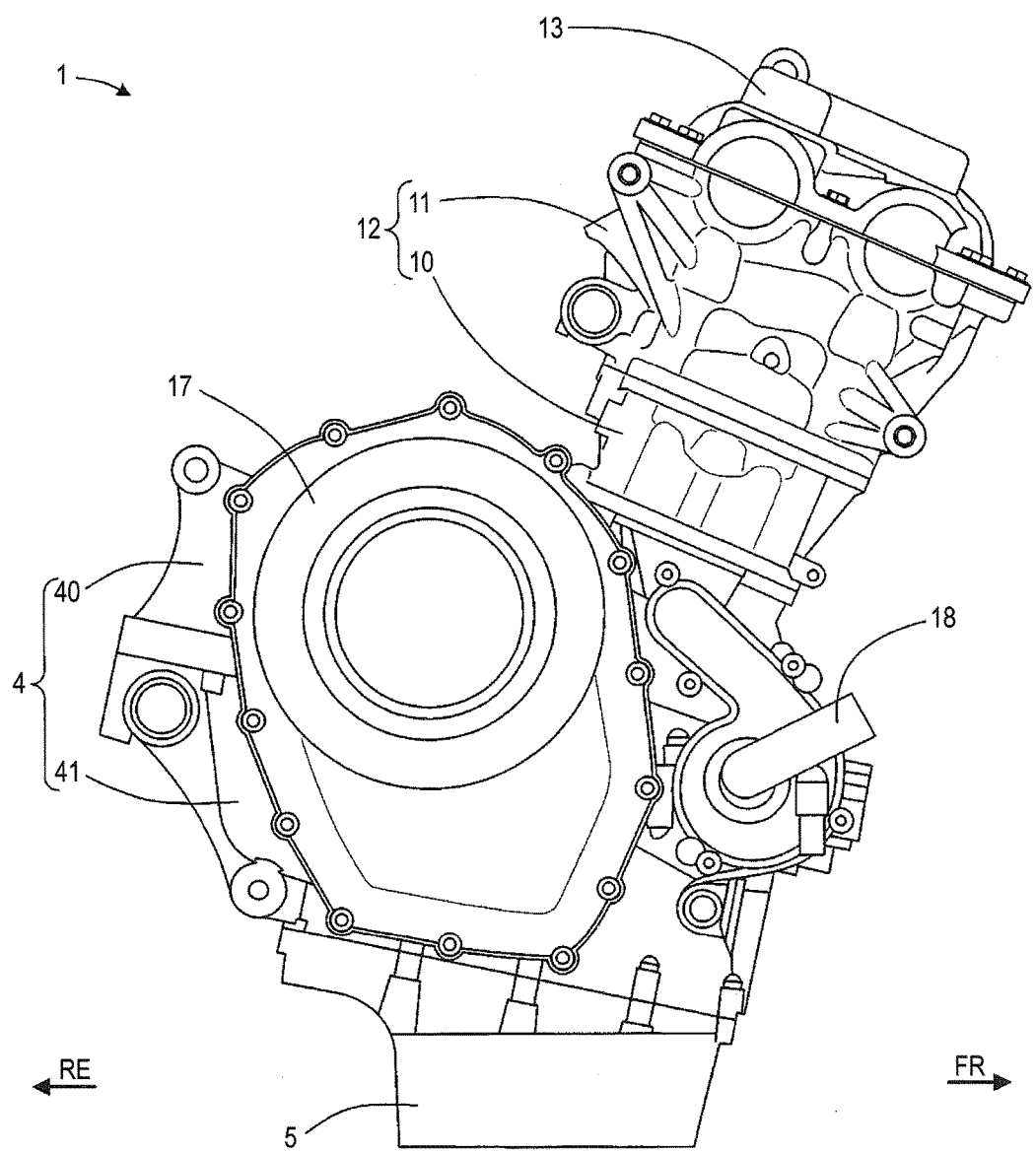
FIG. 1 is a right side view showing a general configuration of a motorcycle engine according to an embodiment of a first aspect of the present invention.

1: Engine
2: Turbocharger
24a: Inlet pipe (oil passage)
24b: Outlet pipe (oil return passage)
30: Crank shaft
33: Balancer shafts
34: First balancer shaft
35: Second balancer shaft
4: Crank case
40a: Connection port (oil passage)
41a: Connection port (oil return passage)
43: Main gallery
48: Sub-gallery
50: Piston jets
101: Engine
121: Crank case
127: Top case
128: Bottom case
134: Joining plane of bottom case and top case
141: Crank shaft
145: Piston
151: Front balancer shaft (balancer shaft)
154: Bottom balancer shaft
161: Oil pump
162: Main gallery
172a, 175a: Oil passage
172c, 175c: Oil passage (another oil passage)
173: Bearing of front balancer shaft
176: Sub-gallery
177: Piston jet
202: Bearing of crank shaft

DETAILED DESCRIPTION OF THE INVENTION

An embodiment of a first aspect of the present invention will be hereinafter described in detail with reference to the accompanying drawings. Although the first aspect of the invention that relates to an engine having a turbocharger is applied to a motorcycle, its application range is not limited to this case. The first aspect of the invention may also be applied to other types of motorcycles, buggy-type motor tricycles, automobiles, etc. As for the directions relative to the vehicle, the forward, rearward, leftward, and rightward directions will be indicated by arrows FR, RE, L, and R, respectively. It is also noted that in each drawing part of the components and members are omitted for convenience of description.

Figure 2:
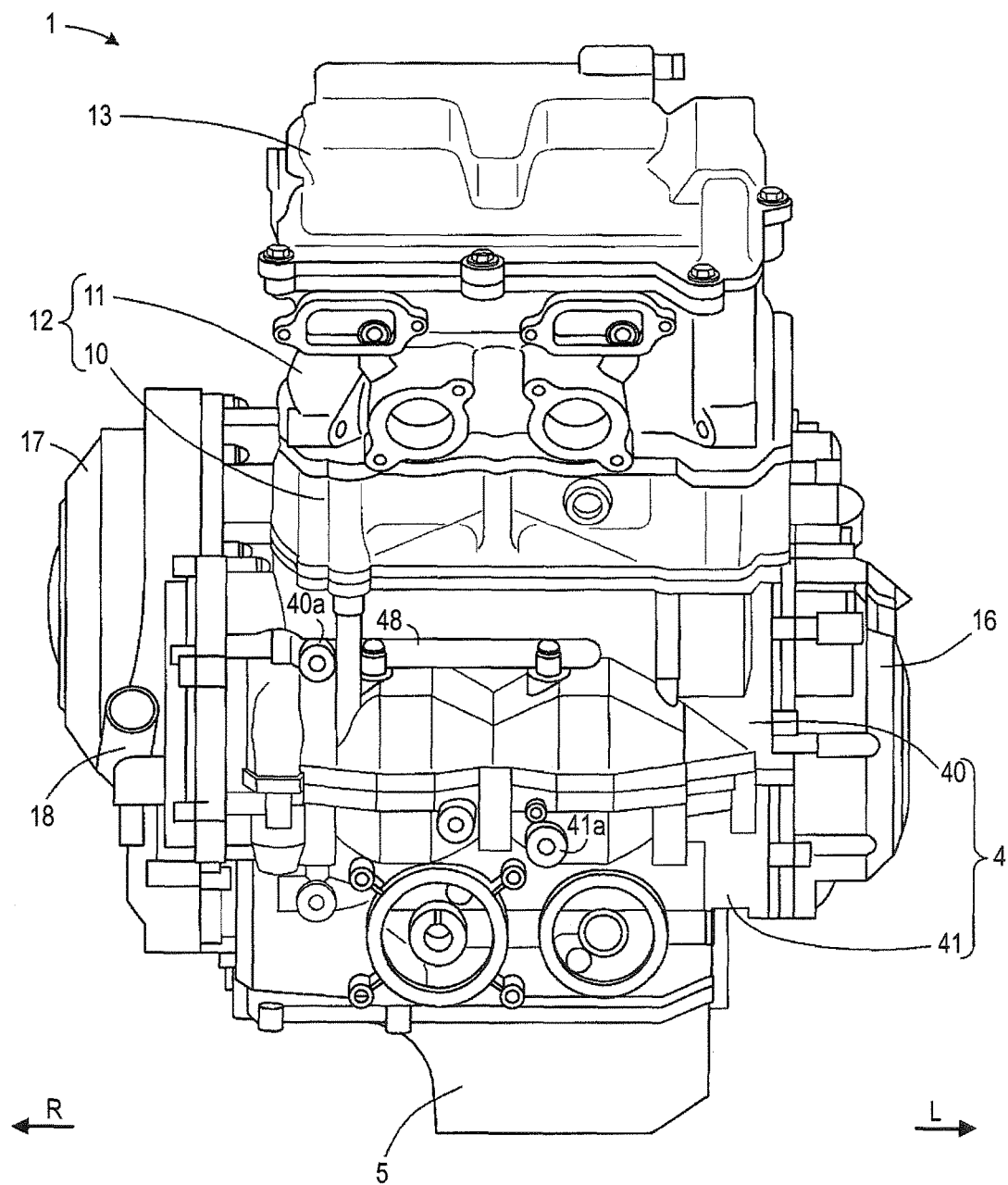
FIG. 2 is a front view of the engine shown in FIG. 1 and its neighborhood.
Figure 3:
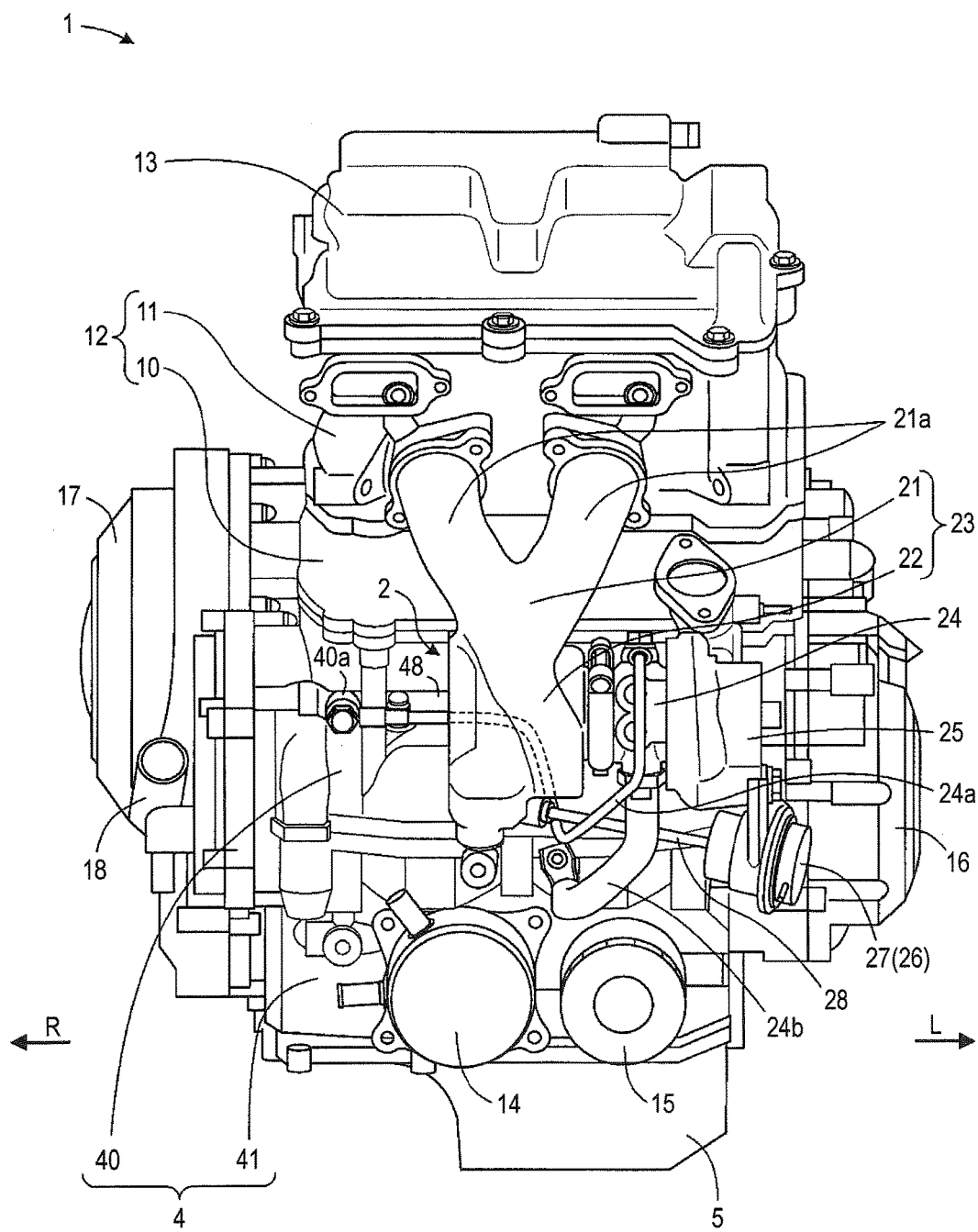
FIG. 3 is a front view of the engine including a turbocharger according to the embodiment of the first aspect of the invention.
Figure 4:
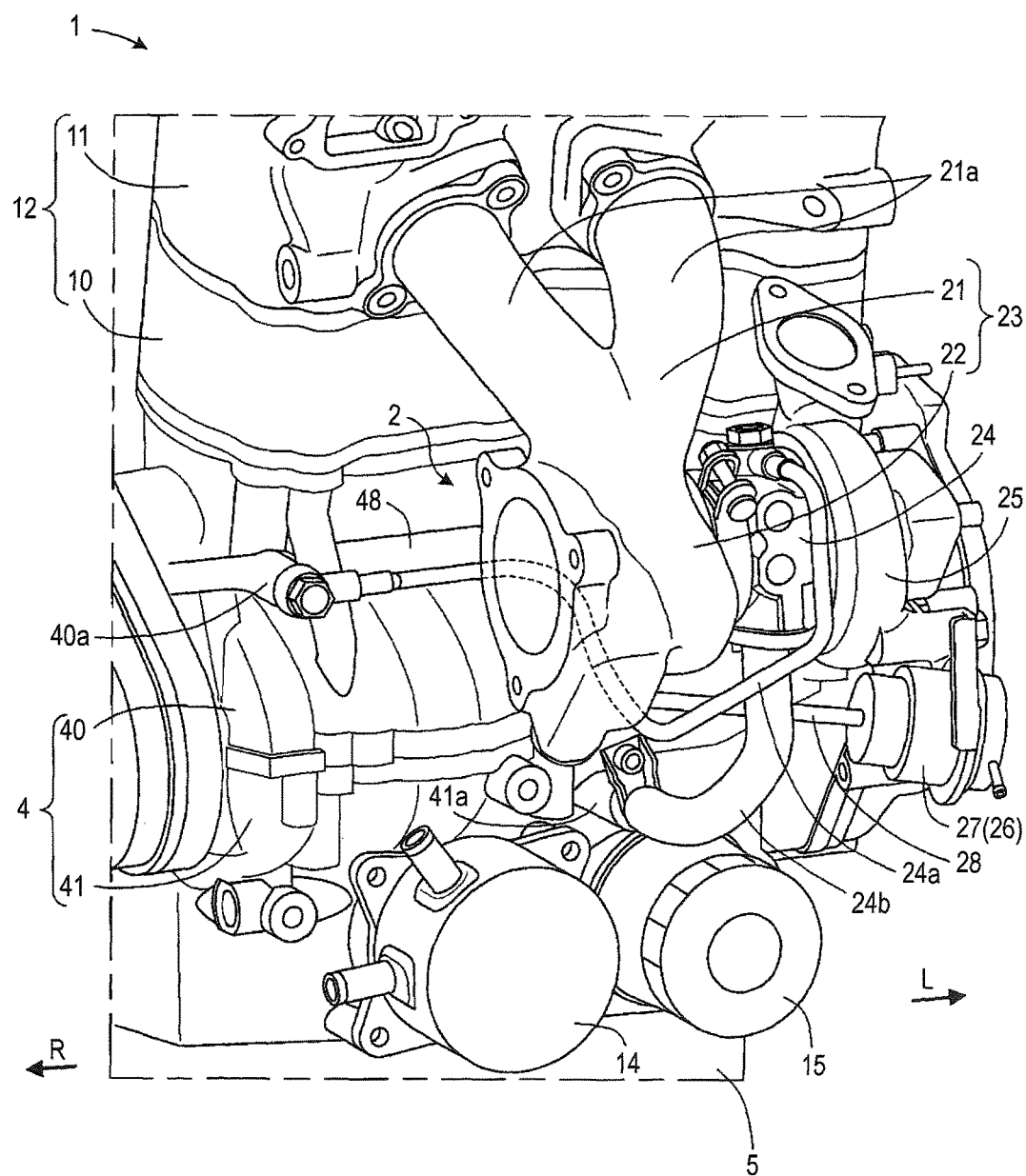
FIG. 4 is a perspective view of part of the engine including the turbocharger according to the embodiment of the first aspect of the invention.

First, a general configuration of a motorcycle according to the embodiment of the first aspect of the invention will be described with reference to FIGS. 1-4. FIG. 1 is a right side view showing a general configuration of an engine 1 of the motorcycle according to the embodiment of the first aspect of the invention. FIG. 2 is a front view of the engine 1 and its neighborhood. FIG. 3 is a front view of the engine 1 including a turbocharger 2 according to the embodiment of the first aspect of the invention. FIG. 4 is a perspective view of part of the engine 1 including the turbocharger 2 according to the embodiment of the first aspect of the invention. In FIGS. 1 and 2, the turbocharger 2 and other components and members are omitted for convenience of description.

As shown in FIGS. 1 and 2, the motorcycle according to the embodiment of the first aspect of the invention is a motorcycle that is equipped with the turbocharger 2, that is, a supercharger that uses exhaust gas of the engine 1 as a drive source (see FIG. 3). The engine 1 is a 2-cylinder, 4-cycle internal combustion engine. The engine 1 is configured in such a manner that components such as pistons (not shown) are housed in a cylinder assembly 12 which is composed of a cylinder block 10 and a cylinder head 11 and a cylinder head cover 13 is attached to the top of the cylinder assembly 12 (cylinder head 11). A crank case 4 which houses a crank shaft (not shown) is attached to a bottom-rear portion of the cylinder assembly 12.

The crank case 4 is configured so as to be dividable in the vertical direction and has a top case 40 and a bottom case 41. A space for containing various shafts is formed in the crank case 4 by combining the top case 40 and the bottom case 41 together. A top-front portion of the top case 40 has an opening, and the cylinder block 10 is attached to the top case 40 so as to close the opening. The bottom case 41 is formed with an opening at the bottom, and an oil pan 5 is attached to the bottom case 41 so as to close the opening.

As shown in FIG. 3, an oil cooler 14 for cooling oil existing in the engine 1 and an oil filter 15 for filtering dirty oil are attached to a front portion of the bottom case 41 at a right position and a left position, respectively.

The crank case 4 is formed with respective openings on the left side and the right side. A magnet cover 16 (not shown in FIG. 1) which covers a magnet (not shown) is attached to the crank case 4 so as to close its left opening, and a clutch cover 17 which covers a clutch (not shown) is attached to the crank case 4 so as to close its right opening.

Being a water-cooling engine, the engine 1 according to the embodiment of the first aspect of the invention is equipped with a water pump 18 for feeding cooling water to it. The right side surface of the crank case 4 is provided with the water pump 18 in front of the clutch cover 17. Although not shown in any drawings, a side stand for supporting a vehicle body (engine 1) is disposed on the bottom-left of the crank case 4.

As shown in FIGS. 3 and 4, the turbocharger 2 is disposed in front of the engine 1 so as to be close to (adjacent to) the front surface of the crank case 4. The turbocharger 2 has a housing body 23 formed by integrally molding an exhaust manifold (hereinafter referred to as a manifold portion 21) and a turbine housing (hereinafter referred to as a housing portion 22; described later). The manifold portion 21 is attached to exhaust ports of the engine 1, whereby the turbocharger 2 is fixed to the engine 1.

The housing portion 22 is shaped like a cylinder whose axis extends in the vehicle width direction (left-right direction) and houses a turbine (not shown) inside. The manifold portion 21 is connected to a top portion of the cylindrical housing portion 22. The manifold portion 21 has a connection portion that is connected to the housing portion 22 and a pair of branch pipes 21a which extend upward from the connection portion. Tip portions of the branch pipes 21a are connected to two respective front exhaust ports of the cylinder head 11.

An exhaust pipe (not shown) is connected to a right end portion of the housing portion 22. A bearing housing 24 which houses a bearing (not shown) of a turbo shaft (not shown) is disposed on the left of the housing portion 22. A compressor housing 25 which houses a compressor (not shown) is disposed on the left of the bearing housing 24.

Figure 8:
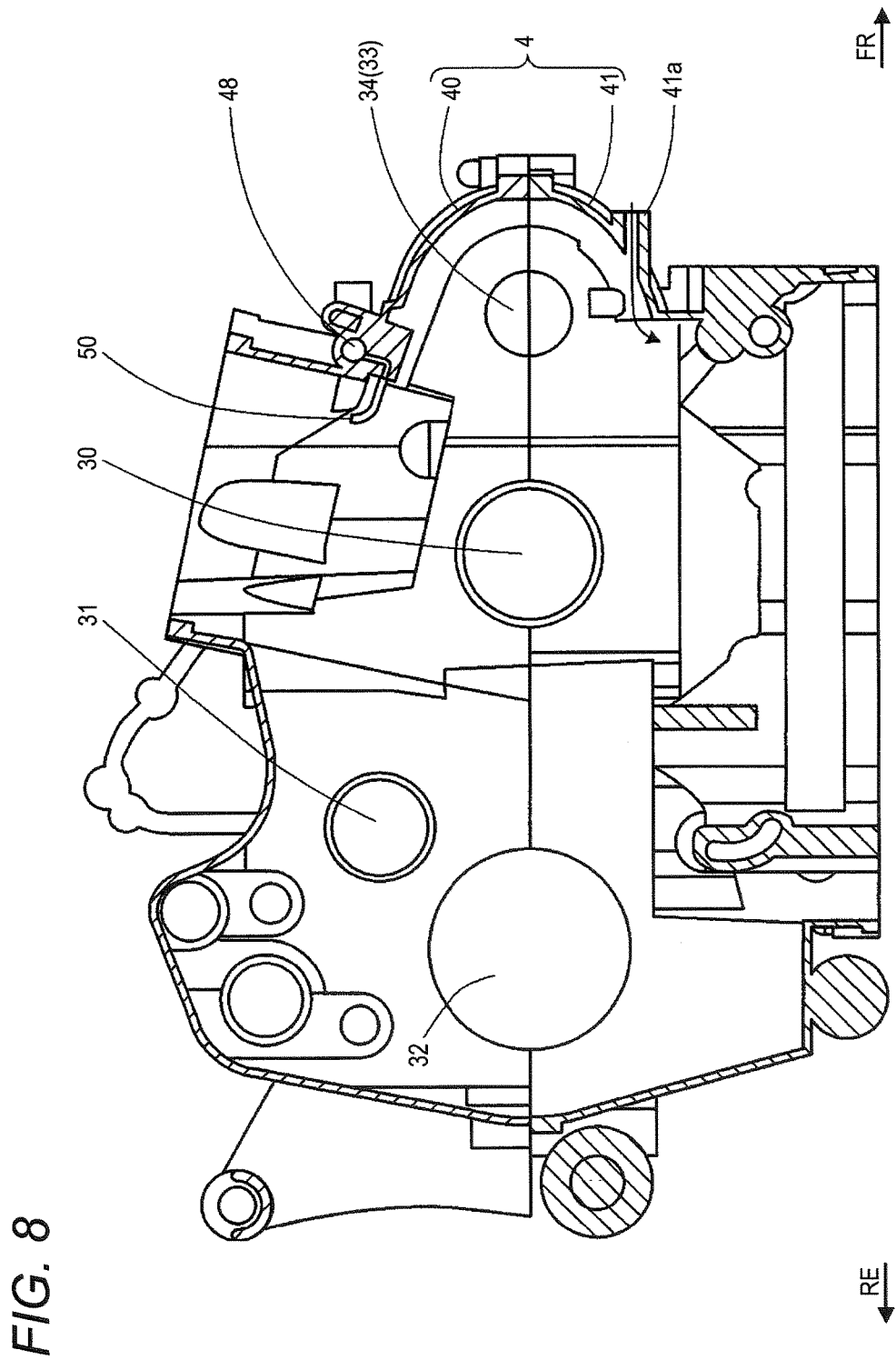
FIG. 8 is a sectional view, taken along line B-B in FIG. 5, of the crank case.

One end of an inlet pipe 24a for supplying oil from the crank case 4 to the turbocharger 2 is connected to a top portion of the bearing housing 24, and the other end of the inlet pipe 24a is connected to the top case 40. More specifically, the top case 40 is formed with, at a front-right position, a connection port 40a for the inlet pipe 24a. As shown in FIG. 8, the connection port 40a is cylindrical and projects forward from a right end portion of a sub-gallery 48 (described later).

The inlet pipe 24a extends leftward from the connection port 40a alongside the sub-gallery 48 and is then bent downward so as to go around the housing portion 22 (goes under it). The inlet pipe 24a goes under an operation shaft 28 of a waste gate valve 26 (described later) so as not to pass through a movable range of the operation shaft 28. Then the inlet pipe 24a extends upward alongside the housing portion 22 and is connected to a top end portion of the bearing housing 24.

One end of an outlet pipe 24b for returning oil that has been used for lubrication of the inside of the turbocharger 2 to the crank case 4 is connected to a bottom portion of the bearing housing 24, and the other end of the outlet pipe 24b is connected to the bottom case 41. More specifically, the bottom case 41 is formed with, at a front-center (in the left-right direction) position, a connection port 41a for the outlet pipe 24b. The connection port 41a is formed on the front surface of the bottom case 41 below the turbocharger 2.

A turbine is fixed to one (right) end portion of the turbo shaft which extends in the vehicle width direction between the housing portion 22 and the compressor housing 25, and the compressor is fixed to the other (left) end portion of the turbo shaft. Thus, the turbine and the compressor can rotate together on the turbo shaft.

The waste gate valve 26 is disposed below the compressor housing 25. The waste gate valve 26 has a role of adjusting the rate of inflow of exhaust gas into the turbine (housing portion 22). The waste gate valve 26 has a main body unit 27 for adjusting the flow rate of exhaust gas inside the housing portion 22 by detecting the pressure in the compressor housing 25. The main body unit 27 is disposed below the compressor housing 25, and the operation shaft 28 which extends toward the housing portion 22 is attached to the main body unit 27.

A valve plug (not shown) is attached to the housing-portion-22-side tip of the operation shaft 28. The valve plug causes valve opening or closure as the operation shaft 28 is operated by the main body unit 27, whereby the flow rate of exhaust gas inside the housing portion 22 is adjusted. For example, when the turbo pressure has risen rapidly, the main body unit 27 operates the operation shaft 28 so that the valve plug causes opening, whereby the rate of inflow of exhaust gas into the housing portion 22 is lowered.

A compressor pipe (not shown) for introducing, into the turbocharger 2, air that has passed through an air cleaner (not shown) is connected to a left end portion of the compressor housing 25. An intake pipe (not shown) for introducing, into the engine 1, air that has been compressed in the compressor housing 25 is connected to a top portion of the compressor housing 25.

In the motorcycle which is equipped with the thus-configured turbocharger 2, whereas exhaust gas of the engine 1 is introduced into the housing portion 22 through the manifold portion 21 according to a throttle manipulation of a rider, external air is introduced into the compressor housing 25 via the air cleaner and the compressor pipe.

In the housing portion 22, the turbine is rotated at high speed by a flow of exhaust gas. And the exhaust gas is discharged to the outside via the exhaust pipe. In the compressor housing 25, the compressor is rotated according to the rotation of the turbine, whereby air is compressed there. The compressed air is introduced into the engine 1 via the intake pipe.

By compressing air by the turbocharger 2 in the above manner, an air-fuel mixture exceeding a total displacement of the engine 1 can be fed to the engine 1 to increase its output power.

Part of oil that circulates through the engine 1 is supplied from the sub-gallery 48 to the turbocharger 2 (bearing housing 24) through the inlet pipe 24a, whereby the turbo shaft and the bearing are lubricated. After being used for lubrication of the turbocharger 2, the oil is returned to the crank case 4 (oil pan 5) via the outlet pipe 24b. The sectional area of the outlet pipe 24b is larger than that of the inlet pipe 24a. Thus, the resistance of the oil return flow passage is reduced and hence the returning of oil from the turbocharger 2 can be performed smoothly.

Incidentally, in conventional motorcycles that are equipped with a turbocharger, that is, a supercharger that compresses intake air using exhaust gas of an engine, the turbocharger is disposed in front of an oil pan. In this case, if the drive shaft (turbo shaft) of the turbocharger is disposed below an oil surface in the oil pan, oil that has been used for lubrication of the inside of the turbocharger is not returned to the oil pan easily. To solve this problem, an oil return passage of the turbocharger is provided with a separate (dedicated) oil pump (scavenging pump) which forcibly returns oil that has been used for lubrication of the turbocharger to the oil pan.

In particular, since the turbocharger is a component that heats to a very high temperature (e.g., higher than 800° C.), if oil remains inside the turbocharger after a stop of the engine, not only is deterioration of the oil accelerated by heat but also the bearing may seize up. It is therefore desirable to discharge oil from the turbocharger as soon as the engine is stopped.

In view of the above, in the embodiment of the first aspect of the invention, the sub-gallery 48 for supplying oil to the shafts in the engine 1 is provided with the oil passage (connection port 40a and inlet pipe 24a) to the turbocharger 2. With this measure, not only can oil be supplied to the shafts at a sufficiently high pressure but also oil can be supplied to the turbocharger 2. Furthermore, since the connection port 41a of the outlet pipe 24b is disposed below the turbocharger 2, oil can be discharged from the turbocharger 2 smoothly utilizing its own weight.

Figure 5:
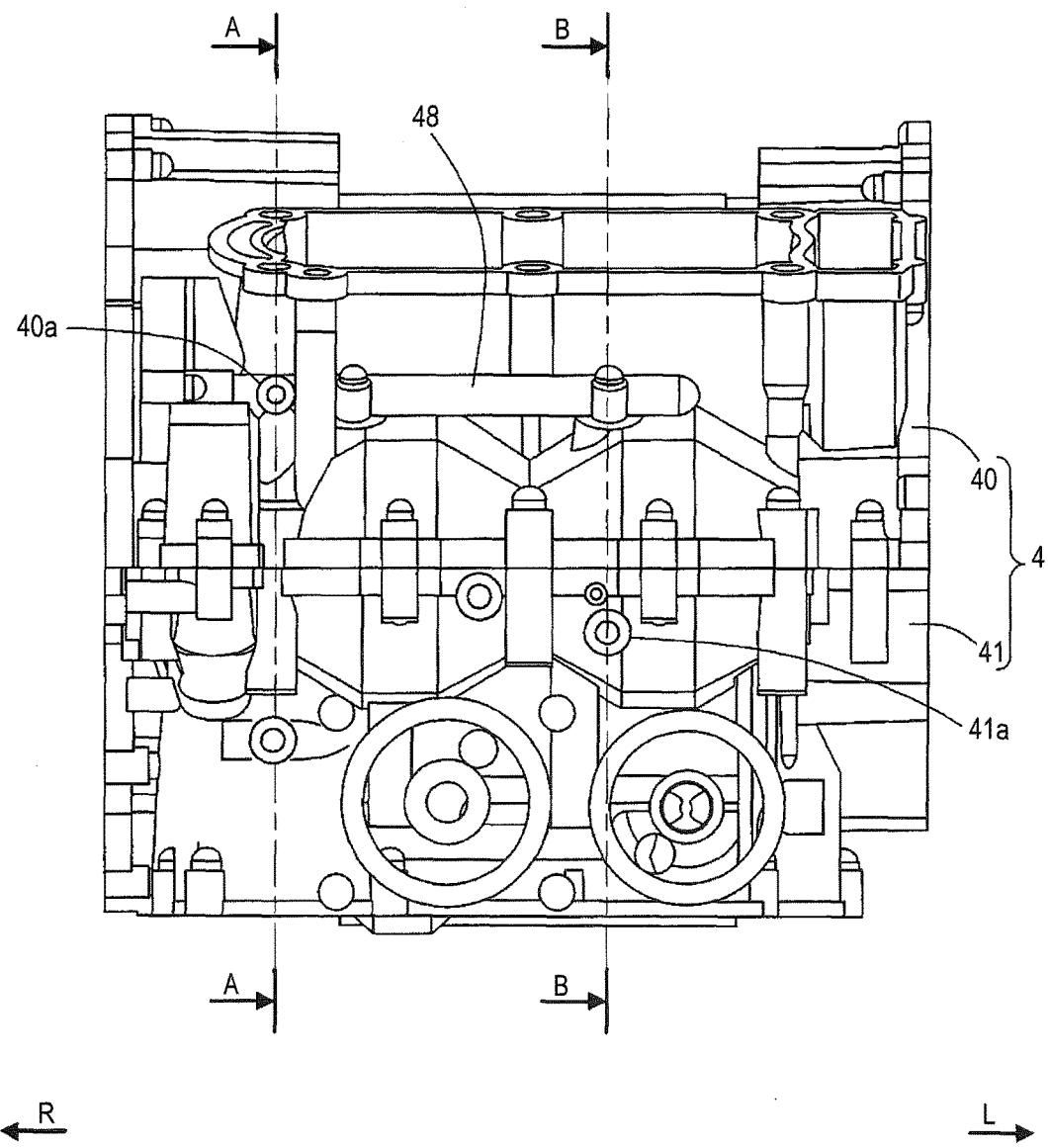
FIG. 5 is a front view of a crank case according to the embodiment of the first aspect of the invention.
Figure 6:
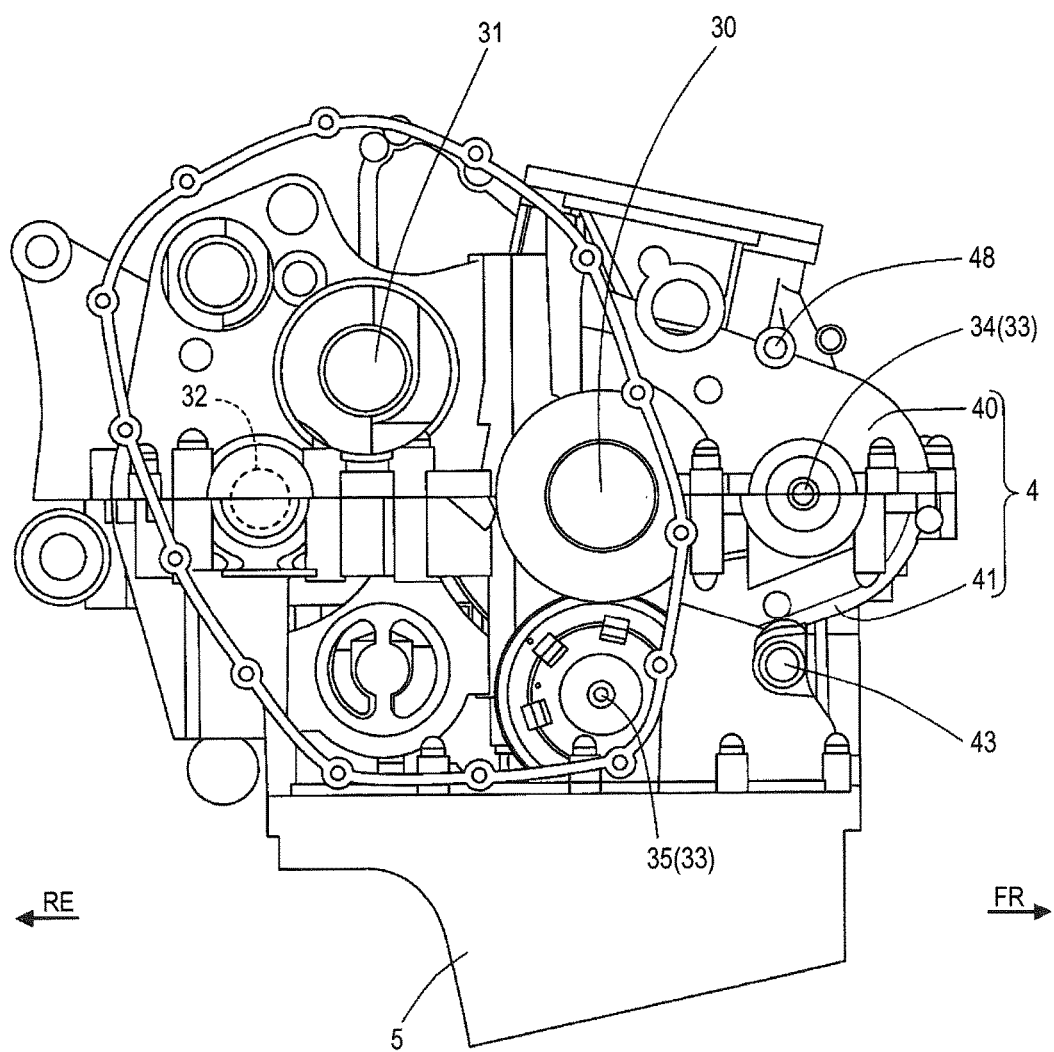
FIG. 6 is a right side view of the engine according to the embodiment of the first aspect of the invention from which a clutch cover is removed.
Figure 7:
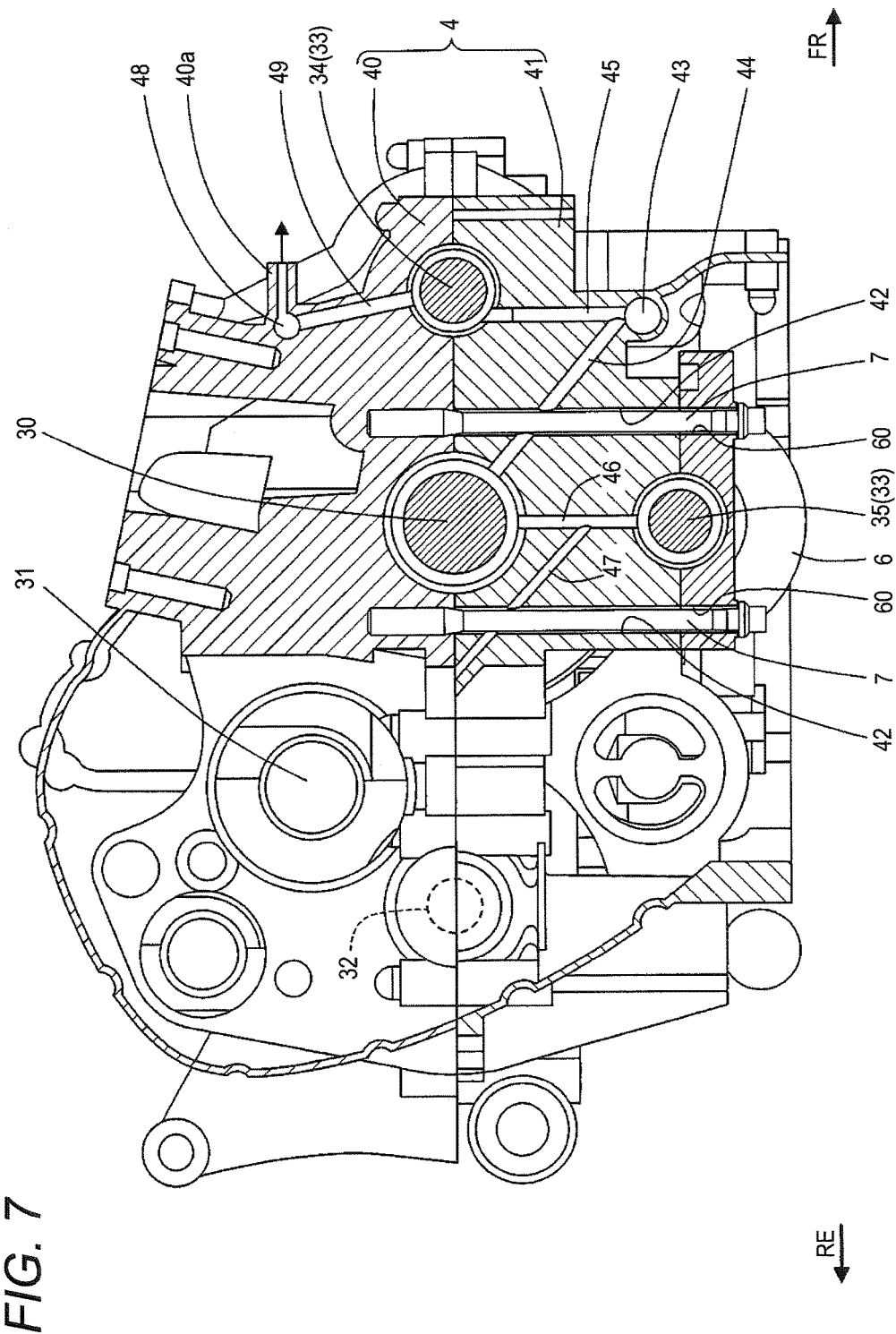
FIG. 7 is a sectional view, taken along line A-A in FIG. 5, of the crank case.

Next, referring to FIGS. 5-8, a description will be made of the arrangement of shafts and oil supply paths in the engine 1 according to the embodiment of the first aspect of the invention. FIG. 5 is a front view of the crank case 4 according to the embodiment of the first aspect of the invention. FIG. 6 is a right side view of the engine 1 according to the embodiment of the first aspect of the invention from which the clutch cover 17 is removed. FIG. 7 is a sectional view, taken along line A-A in FIG. 5, of the crank case 4. FIG. 8 is a sectional view, taken along line B-B in FIG. 5, of the crank case 4.

First, the arrangement of the shafts will be described. As shown in FIGS. 5 and 6, in addition to a crank shaft 30, various shafts for transmitting drive power of the engine 1 are housed in the crank case 4. In the following, a description will be made of the locations of the various shafts using the position of the crank shaft 30 as a reference. The crank shaft 30 is housed a little in front of the center of the crank case 4. Two pistons (not shown) are attached to the crank shaft 30 via respective connecting rods (not shown) and arranged in the axial direction.

A counter shaft 31 is disposed in the top-rear of the crank shaft 30. The right end of the counter shaft 31 is provided with the clutch (not shown). A drive shaft 32 is disposed in the bottom-rear of the counter shaft 31. The drive shaft 32 is provided with various shift gears. Plural (in the embodiment, two) balancer shafts 33 for preventing rotation-induced vibration of the engine 1 are disposed around the crank shaft 30.

The balancer shafts 33 include a first balancer shaft 34 which is disposed in front of the crank shaft 30 and a second balancer shaft 35 which is disposed (right) under the crank shaft 30. The first balancer shaft 34 and the second balancer shaft 35 extend parallel with the axis of the crank shaft 30, and are arranged in such a manner that the straight line connecting the first balancer shaft 34 and the crank shaft 30 and that connecting the second balancer shaft 35 and the crank shaft 30 form approximately a right angle.

As shown in FIG. 7, in the embodiment of the first aspect of the invention, the first balancer shaft 34, the crank shaft 30, and the drive shaft 32 are located at a joining plane of the top case 40 and the bottom case 41. More specifically, three bearings are formed at the joining plane of the top case 40 and the bottom case 41 so as to be arranged in the front-rear direction, and receive the first balancer shaft 34, the crank shaft 30, and the drive shaft 32 in this order from the front side. The second balancer shaft 35 is supported by the bottom case 41 and a balancer housing 6 which houses the second balancer shaft 35. A bearing is formed at a joining plane of the bottom case 41 and the balancer housing 6, and the second balancer shaft 35 is set in this bearing.

Plural (only two are shown in FIG. 7) through-holes 42/60 through which to insert fastening bolts 7 are formed through the bottom case 41 and the balancer housing 6. The plural through-holes 42/60 are formed at such positions that the crank shaft 30 or the second balancer shaft 35 is interposed between them in the front-rear direction. The top case 40 is formed with screw holes (not shown) at positions corresponding to the plural respective through-holes 42/60. The top case 40, the bottom case 41, and the balancer housing 6 are fixed to each other (integrated together) by inserting the fastening bolts 7 into the through-holes 42/60 from below and screwing them into the top case 40.

Now, a description will be made of the oil passages in the crank case 4. As shown in FIG. 7, a main gallery 43 which is one oil passage in the engine 1 is formed in the bottom case 41 below the first balancer shaft 34 in front of the second balancer shaft 35. The main gallery 43 extends in the left-right direction.

Oil passages 44 and 45 for supplying oil from the main gallery 43 to the crank shaft 30 and the first balancer shaft 34, respectively, and an oil passage 46 for supplying oil from the crank shaft 30 to the second balancer shaft 35 are formed in the bottom case 41. An oil passages 47 for supplying oil to the drive shaft 32 is connected to the oil passage 46. The oil passages 44 and 47 are formed so as to penetrate through the respective through-holes 42 obliquely. With this measure, the through-holes 42 for the fastening bolts 7 can be utilized as parts of the oil passages.

On the other hand, in the top case 40, the sub-gallery 48 is formed above the first balancer shaft 34 so as to extend in the left-right direction. An oil passage 49 for supplying oil from the first balancer shaft 34 to the sub-gallery 48 is formed in the top case 40.

In the embodiment, oil that is stored in the oil pan 5 is pumped up by an oil pump and supplied to the main gallery 43. The oil that has been supplied to the main gallery 43 is supplied to the shafts and the bearings while being kept at a sufficiently high pressure. Part of the oil, that is, oil supplied to the first balancer shaft 34, is then supplied to the sub-gallery 48 through the oil passage 49.

The oil that has been supplied to the sub-gallery 48 is then supplied to the turbocharger 2 (see FIG. 3) via the connection port 40a of the inlet pipe 24a and the inlet pipe 24a. As described later, oil is also supplied to piston jets 50 (see FIG. 8). In this manner, oil that has been used for lubrication of the first balancer shaft 34 is used again for lubrication of the turbocharger 2 and cooling of the pistons. As described above, oil can be supplied to the individual components provided in the engine 1.

In the embodiment, the shafts are arranged in the above-described manner and the main gallery 43 and the sub-gallery 48 are formed in free regions located in the vicinities of the two balancer shafts 33. More specifically, the first balancer shaft 34 is disposed below the sub-gallery 48 and the main gallery 43 is formed below the first balancer shaft 34. This structure makes it possible to form the oil passages to the shafts (bearings) in the form of straight through-holes. Thus, the oil passages can be formed by simple boring and the number of machining steps can be reduced.

In particular, since the oil passage 45 from the main gallery 43 to the first balancer shaft 34 and the oil passage 49 from the first balancer shaft 34 to the sub-gallery 48 can be straight ones, the oil passages 45 and 49 can be made short, suppressing reduction in oil pressure.

Since the crank shaft 30 and the second balancer shaft 35 are adjacent to each other in the bottom case 41, the oil passage 46 to connect the crank shaft 30 and the second balancer shaft 35 can be formed easily by boring. Thus, the crank case 4 can be made lighter than in a structure that separate (independent) oil passages are formed utilizing unused solid portions of the crank case 4.

As shown in FIG. 8, part of oil that has been fed to the sub-gallery 48 goes deep into it and is supplied to the piston jets 50. The pistons (not shown) are cooled by oil that is jetted from the piston jets 50 toward them. The supply of oil to the piston jets 50 lowers the oil pressure in the sub-gallery 48. However, since the lubrication path from the main gallery 43 (see FIG. 7) to the sub-gallery 48 is different from that from the main gallery 43 to the bearing of the crank shaft 30. Thus, the influence of the oil pressure reduction due to jetting by the piston jets 50 on the pressure of oil supplied to the bearing of the crank shaft 30 can be lessened.

Since the piston jets 50 have open ends, when the engine 1 is stopped and the driving of the oil pump is stopped, air inside the crank case 4 is sucked by the piston jets 50 and introduced to the turbocharger 2 (see FIG. 3) via the sub-gallery 48 and the inlet pipe 24a (see FIG. 3). As a result, when oil in the oil passages is replaced by air, the air can be introduced into the oil passages smoothly, which enables smooth oil discharge. Thus, the oil passages are not likely clogged with oil.

Furthermore, since the sub-gallery 48 is located above the oil surface in the crank case 4, the connection port 40a (see FIG. 7) of the inlet pipe 24a can be set above the oil surface. This increases the degree of freedom in determining the location of the connection port 41a of the outlet pipe 24b which is disposed below the connection port 40a of the inlet pipe 24a.

Still further, the oil return passage (outlet pipe 24b and the connection port 41a) is connected to a wall of a balancer room that houses the first balancer shaft 34. Thus, when oil that has been used for lubrication of the inside of the turbocharger 2 is returned to inside the crank case 4, the oil flows down the wall surface of the balancer room. As a result, the oil is not agitated and hence oil scattering and generation of air bubbles can be suppressed.

As described above, according to the embodiment, high-pressure oil is supplied from the oil pump to the main gallery 43 and high-pressure oil is also supplied from the main gallery 43 to the bearings of the balancer shafts 33. Furthermore, oil is supplied from the bearing of the first balancer shaft 34 to the other shafts and the turbocharger 2 via the sub-gallery 48 and the oil passages. Thus, high-pressure oil can be used effectively. Since the oil passage that leads to the turbocharger 2 is connected to the sub-gallery 48, the turbocharger 2 can be lubricated while oil is supplied to the shafts properly. Since the same oil passages are used for supplying oil to the bearing of the first balancer shaft 34 and the sub-gallery 48, no independent oil passages for these purposes need to be formed in the crank case 4. As a result, no independent pipes need to be provided, the weight or the number of machining steps is not increased, and the oil passages can be shortened.

The first aspect of the invention is not limited to the above embodiment and can be practiced by modifying it in various manners. The first aspect of invention is not limited to the sizes, shapes, etc. shown in the accompanying drawings and they can be modified as appropriate within the confines that the advantages of the first aspect of the invention can be obtained. Other modifications can also be made as appropriate as long as the related object of the invention is attained.

For example, although the above embodiment is directed to the 2-cylinder engine 1, the invention is not limited to that case; the invention can also be applied to single-cylinder engines and engines having three or more cylinders.

Although the above embodiment is directed to the water-cooling engine 1, the invention is not limited to that case; the invention can also be applied to air-cooling engines and other types of engines.

Although in the embodiment the sub-gallery 48 is disposed in front of the crank shaft 30, the invention is not limited to that case; the sub-gallery 48 may be disposed in the rear of the crank shaft 30.

Although in the embodiment oil is supplied from the sub-gallery 48 to only the turbocharger 2 and the piston jets 50, the invention is not limited to that case; oil may also be supplied from the sub-gallery 48 to the cylinder head 11 etc.

Although in the embodiment in circulating the engine 1 oil is supplied from the main gallery 43 to the sub-gallery 48 via the bearing of the first balancer shaft 34, the invention is not limited to that case; oil may be supplied directly to the sub-gallery 48 from the main gallery 43.

Providing the above-described advantage that oil can be supplied to the individual shafts in the engine properly while the turbocharger is lubricated, the first aspect of the invention is particularly useful when applied to lubrication structures of engines having a turbocharger and motorcycles having such a lubrication structure.

An embodiment of a second aspect of the invention will be hereinafter described in detail with reference to the accompanying drawings. Although the second aspect of the invention is directed to an engine lubrication structure of a motorcycle, its application range is not limited to this case. The second aspect of the invention may also be applied to other types of vehicles such as automobiles, etc. As for the directions relative to the vehicle, the forward, rearward, leftward, and rightward directions will be indicated by arrows FR, RE, L, and R, respectively.

Figure 9:
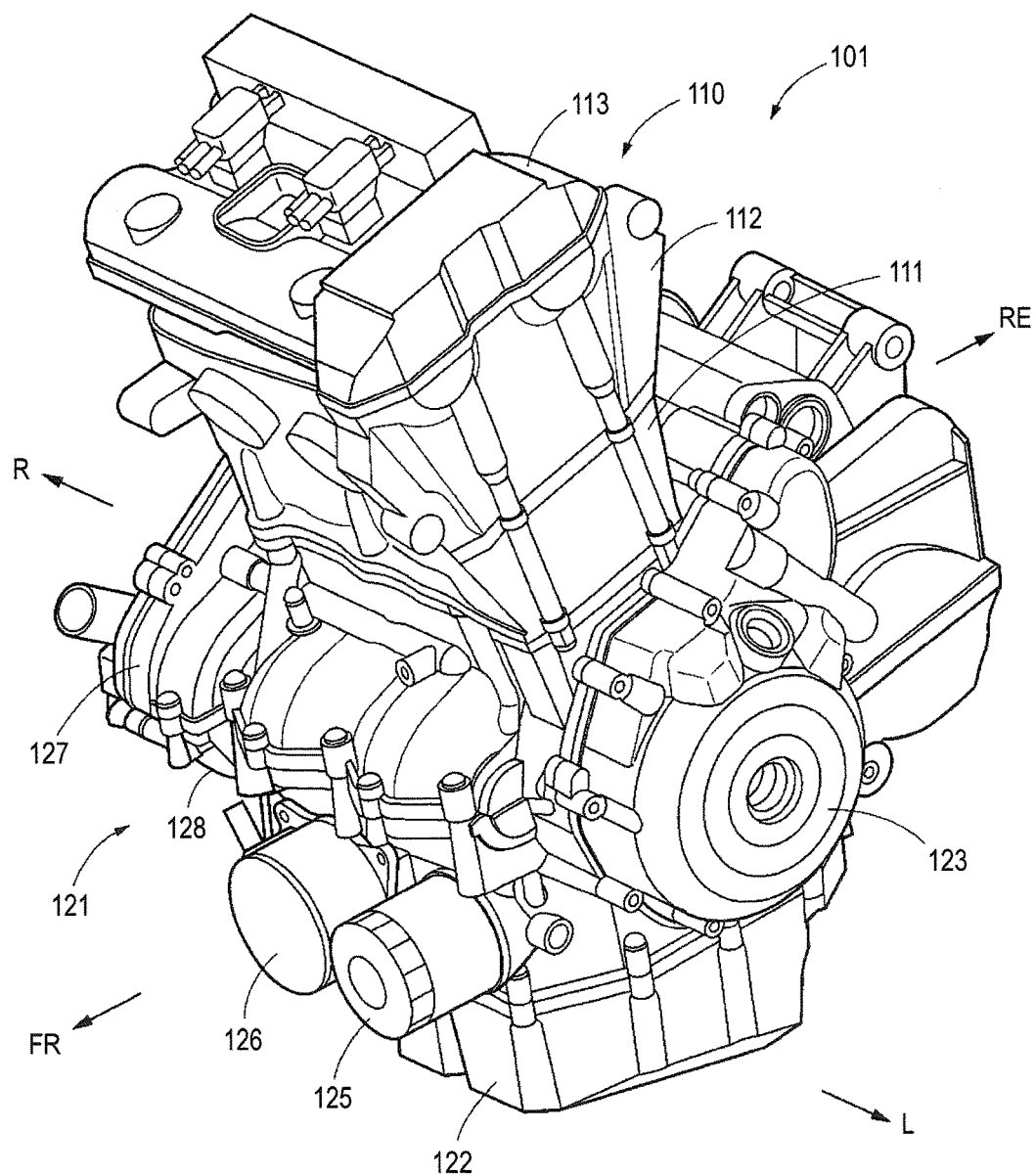
FIG. 9 is a perspective view of an engine according to an embodiment of a second aspect of the invention.
Figure 10:
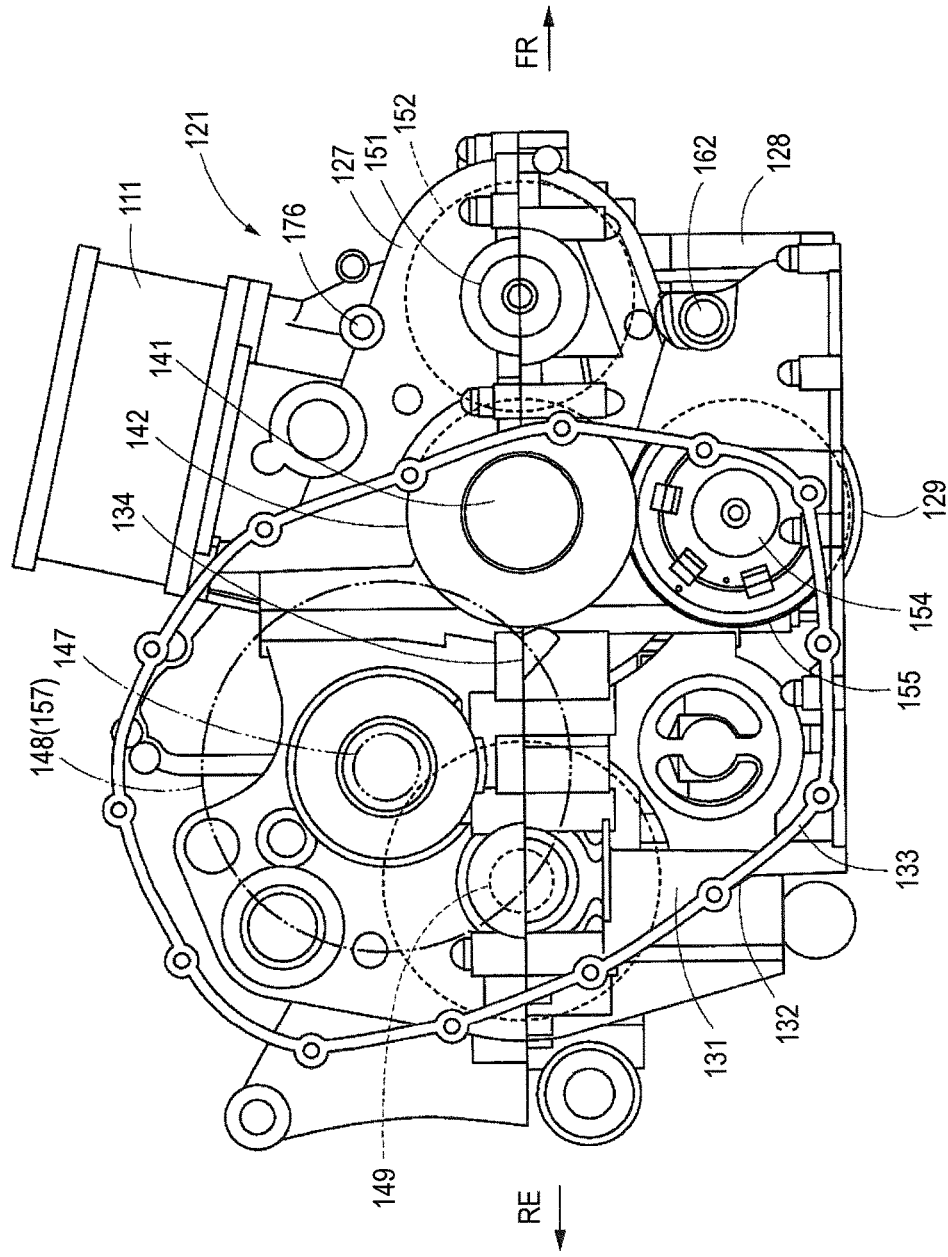
FIG. 10 is a right side view of a crank case according to the embodiment of the second aspect of the invention.
Figure 11:
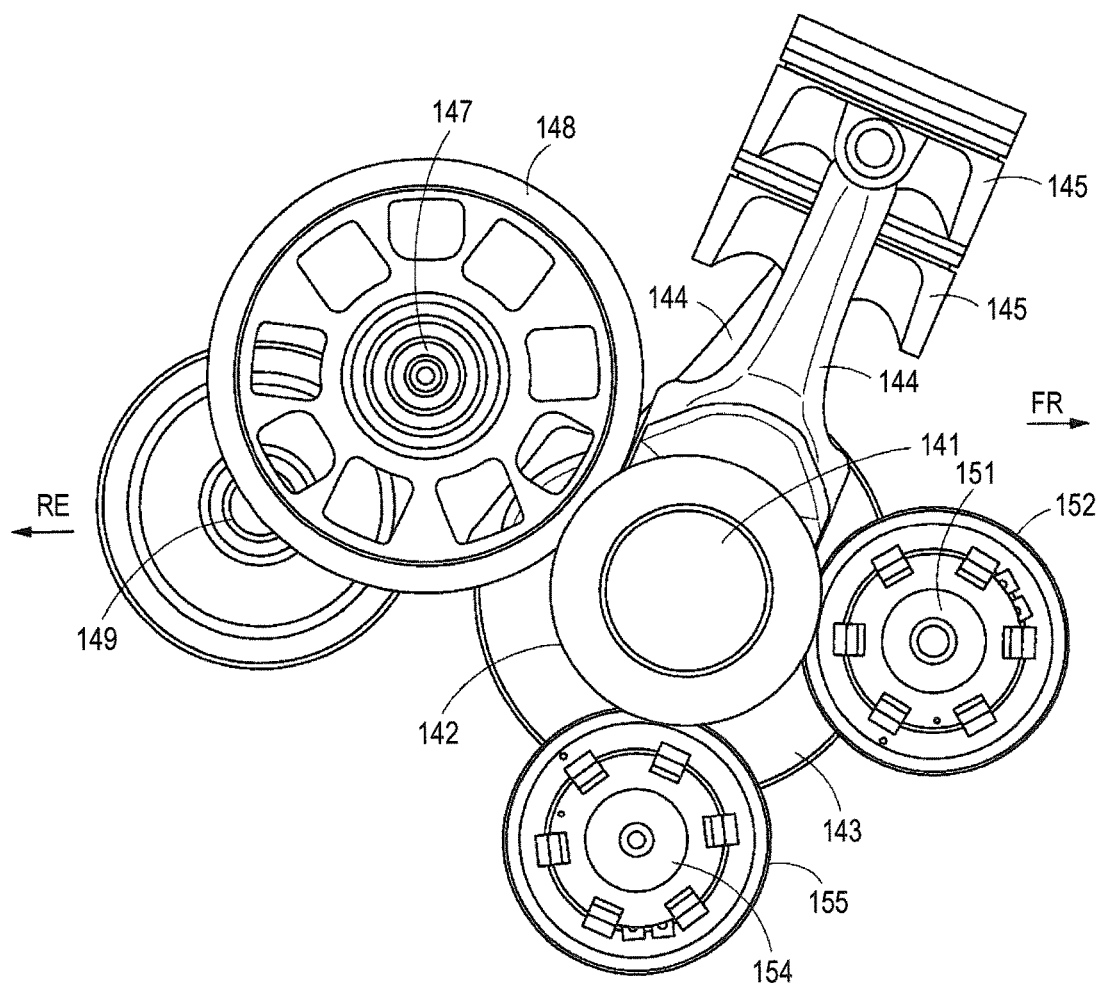
FIG. 11 is a side view showing an arrangement of shafts used in the embodiment of the second aspect of the invention.

FIG. 9 is a perspective view of an engine 101 according to the embodiment of the second aspect of the invention. FIG. 10 is a right side view of a crank case 121 according to the embodiment of the second aspect of the invention. FIG. 11 is a side view showing an arrangement of shafts used in the embodiment of the second aspect of the invention. In FIG. 10, for convenience of description, a counter shaft 147 and a clutch 157 are drawn by two-dot chain lines and a front balancer shaft 151 and a drive shaft 149 are drawn by broken lines.

As shown in FIG. 9, the engine 101 is a parallel, 2-cylinder internal combustion engine which is configured in such a manner that a cylinder assembly 110 is placed on the crank case 121. The cylinder assembly 110 is configured in such a manner that a cylinder head 112 is placed on a cylinder block 111 which is placed on the crank case 121 and a head cover 113 is attached to the top of the cylinder head 112. An oil pan 5 for storing oil is attached to the bottom of the crank case 121. A generator cover 123 which defines a generator room is attached to a left side portion of the crank case 121. An oil filter 125 an oil cooler 126 are attached to a front portion of the crank case 121.

As shown in FIG. 10, the crank case 121 is configured so as to be dividable in the vertical direction and has a top case 127 and a bottom case 128. A right-hand space 131 of the crank case 121 is exposed to the outside by removing a clutch cover (not shown). The right-hand space 131 of the crank case 121 is a space that is separated from an inside crank room and mission room by side walls of the top case 127 and the bottom case 128 and surrounded by a circumferential wall 132 which projects from side walls of the top case 127 and the bottom case 128. Part of the right-hand space 131 of the crank case 121 is seen from the outside through an opening of a joining surface 133, for joining to a clutch cover, of the circumferential wall 132.

Three major shafts, that is, a crank shaft 141, a counter shaft 147, and a drive shaft 149, are disposed through side walls (journal walls) of the crank case 121 parallel with each other so as to form a triangle. The crank shaft 141 is housed in the inside crank room and supported rotatably at a joining plane 134 of the top case 127 and the bottom case 128. The counter shaft 147 is housed in the inside mission room, disposed in the rear of the crank shaft 141, and supported rotatably by side walls of the top case 127. The drive shaft 149 is housed in the inside mission room, disposed in the rear of the counter shaft 147, and supported rotatably at the joining plane 134 of the top case 127 and the bottom case 128.

A front balancer shaft 151 is disposed in front of the crank shaft 141 and a bottom balancer shaft 154 is disposed under the crank shaft 141. The front balancer shaft 151 is housed in a front balancer room 186 (see FIG. 15B) and supported rotatably at the joining plane 134 of the top case 127 and the bottom case 128. The bottom balancer shaft 154 is supported rotatably at a joining plane 135 (see FIG. 14A) of the bottom case 128 and a balancer housing 129 which is attached to the bottom case 128. Switching can be made between a 1-axis balancer and a 2-axis balancer by attaching or detaching the bottom balancer shaft 154 by removing the balancer housing 129 from the bottom case 128.

A primary drive gear 142 of the crank shaft 141, a primary driven gear 148 of the counter shaft 147, and a bottom balancer driven gear 155 of the bottom balancer shaft 154 are disposed in the right-hand space 131 of the crank case 121. The primary driven gear 148, a front balancer driven gear 152, and the bottom balancer driven gear 155 are in mesh with the primary drive gear 142. Since the three kinds of gears are thus driven by the single gear, the crank shaft 141 need not be provided with other gears and hence its overall length can be shortened.

As mentioned above, the right-hand space 131 of the crank case 121 is exposed to the outside through the opening of the joining surface 133 for joining to the clutch cover. Most of the primary drive gear 142 is exposed to the outside from the crank case 121, and a clutch 157 are exposed fully to the outside. The front balancer driven gear 152 is hidden inside the crank case 121, and a large part of the bottom balancer driven gear 155 is exposed to the outside. Since the gears are thus exposed to the outside from the right-hand space 131, they can be positioned with respect to each other easily (phase matching).

As shown in FIG. 11, the crank shaft 141 is configured in such a manner that crank webs 143 are connected to each other by crank pins (not shown) and crank journals (not shown). Pistons 145 are connected to the crank pins by connecting rods 144, respectively, whereby reciprocating movements of the pistons 145 are converted into rotation of the crank shaft 141. Rotational power of the crank shaft 141 is transmitted to the counter shaft 147 by the primary drive gear 142 and the primary driven gear 148. Rotational power of the counter shaft 147 is transmitted to the drive shaft 149 at a prescribed gear ratio corresponding to a combination of shift gears (not shown).

Rotational power of the crank shaft 141 is also transmitted to the front balancer shaft 151 by the primary drive gear 142 and the front balancer driven gear 152, and to the bottom balancer shaft 154 by the primary drive gear 142 and the bottom balancer driven gear 155. The front balancer shaft 151 and the bottom balancer shaft 154 cancel out periodic vibration of the crank shaft 141. Since the connecting rods 144, the bottom balancer shaft 154, the front balancer shaft 151, and the counter shaft 147 are disposed around the crank shaft 141, that is, above, below, in front of, and in the rear of the crank shaft 141, respectively, the space inside the crank case 121 (see FIG. 10) can be utilized effectively.

Since in the thus-configured crank case 121 the bottom balancer shaft 154 is disposed below the crank shaft 141, the front-rear width of the crank case 121 can be made shorter than in a case that balancer shafts are disposed in front of and in the rear of a crank shaft and the degree of mass concentration can be lowered. Furthermore, since a main gallery 162 (see FIG. 10) is disposed in front of the bottom balancer shaft 154, the bottom balancer shaft 154 does not interfere with the main gallery 162 in their arrangement. With this arrangement which is different from an ordinary arrangement in which a main gallery is disposed right under a crank shaft, the lubrication paths to the individual components of the engine 101 need to be changed.

In particular, crank case 121 lubrication paths are necessary that are specialized for the 2-axis balancer structure in which the balancer shafts 152 and 154 are disposed in front of and below the crank shaft 141. In the embodiment, a sub-gallery 176 is formed in addition to the main gallery 162 in the crank case 121 and oil that comes from the main gallery 162 is supplied to the sub-gallery 176 via a bearing 173 (see FIG. 14A) of the front balancer shaft 151. Since oil that has passed the front balancer shaft 151 has a sufficiently high pressure, oil can be reused for lubrication of several components of the engine 101 by causing it to pass through the sub-gallery 176.

Lubrication paths, in the crank case 121, of the engine 101 according to the embodiment of the second aspect of the invention will be described below with reference to a block diagram of FIG. 12.

Figure 12:
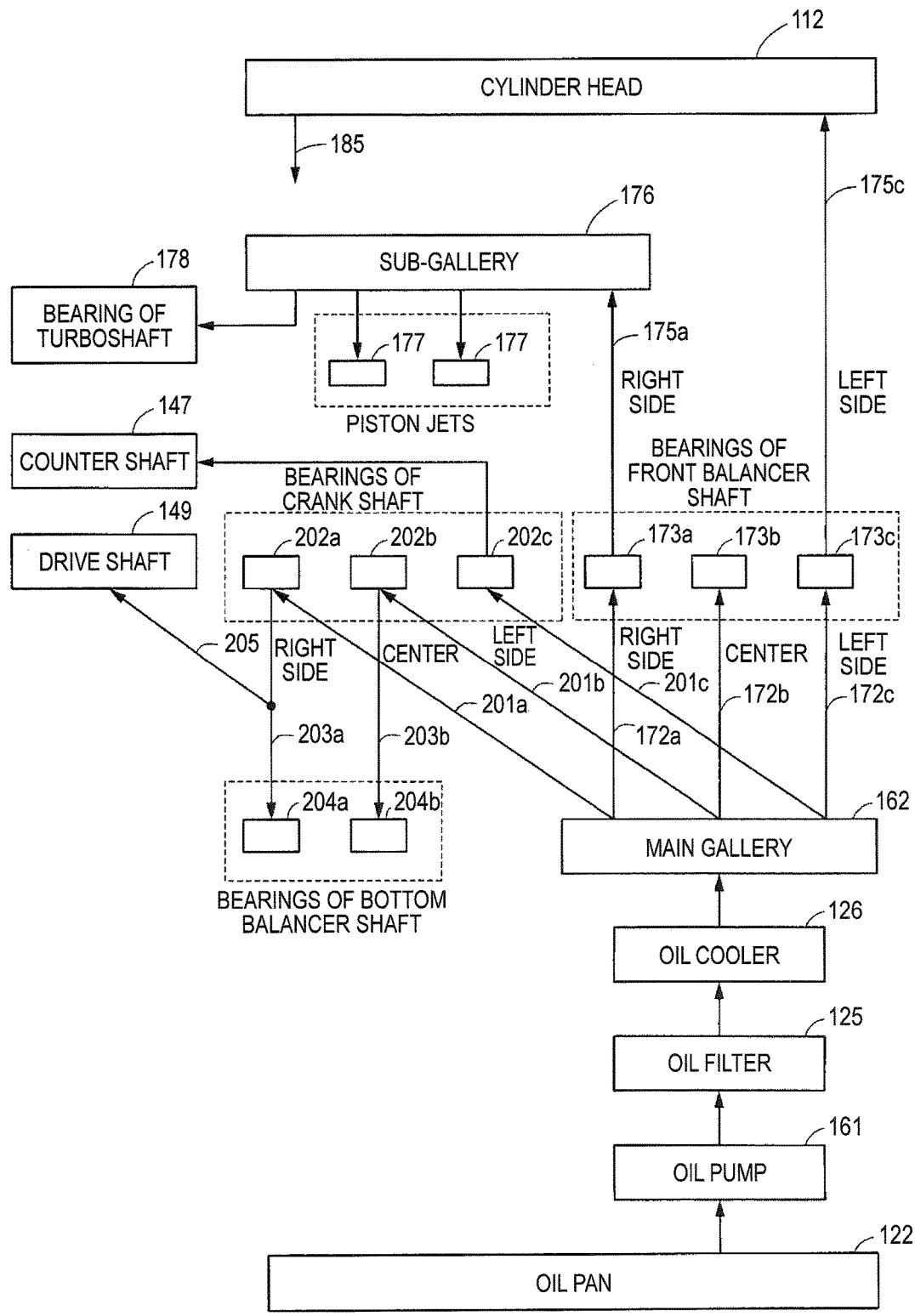
FIG. 12 is a block diagram illustrating lubrication paths of the engine according to the embodiment of the second aspect of the invention

As shown in FIG. 12, oil is stored in an oil pan 122 (see FIG. 9) which is disposed under the crank case 121. Oil existing in the oil pan 122 is sucked, via a strainer, by an oil pump 161 which is driven by the counter shaft 147, and then sent to the oil filter 125 by the oil pump 161. Oil existing in the oil filter 125 is sent to the oil cooler 126 and then to the main gallery 162 by the oil pump 161. During that course, minute foreign substances are removed from the oil by the oil filter 125 and the oil is cooled by the oil cooler 126.

Figure 13:
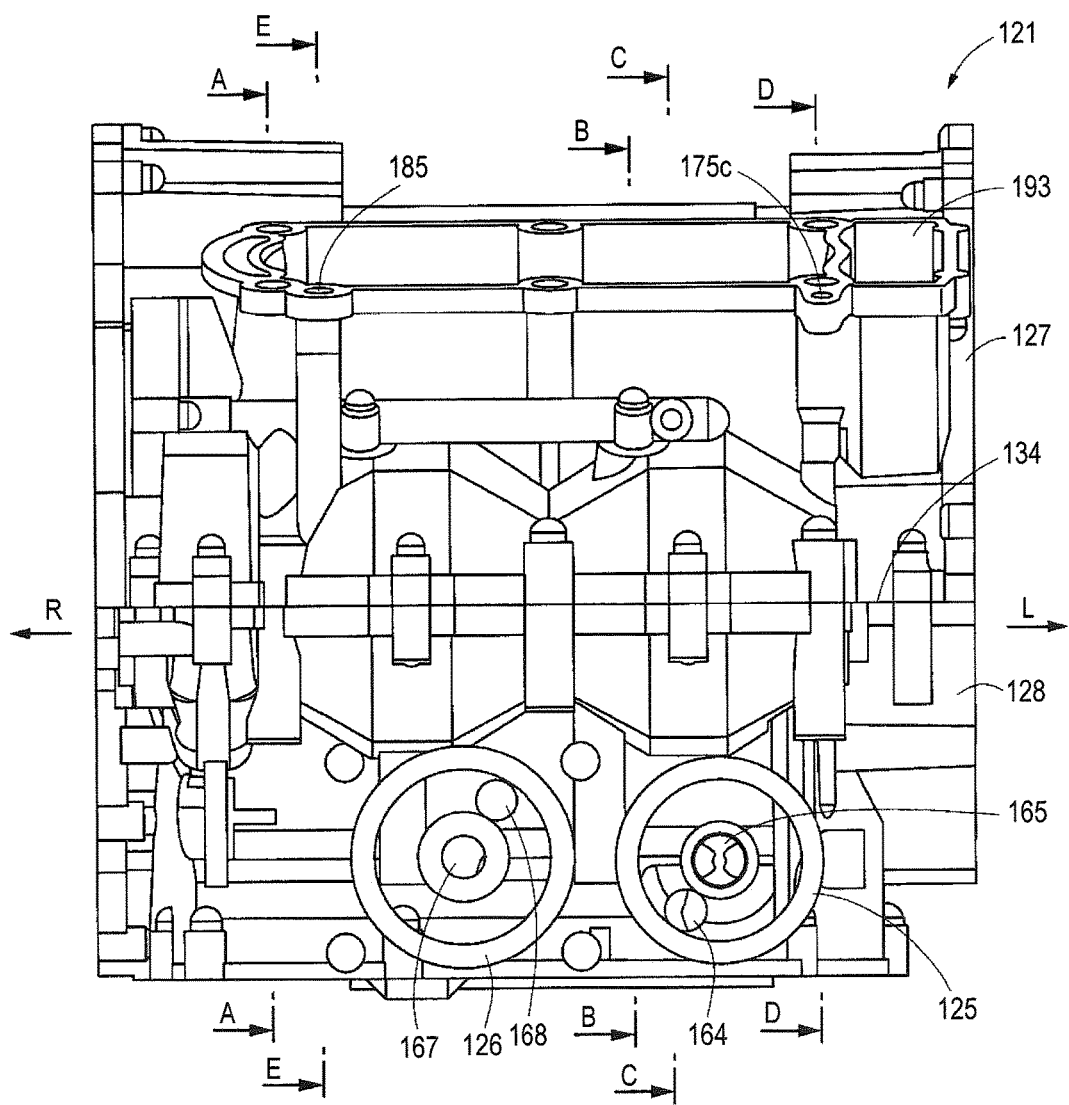
FIG. 13 is a front view of the crank case according to the embodiment of the second aspect of the invention.

As shown in FIG. 13, the oil filter 125 and the oil cooler 126 are attached to a front portion of the crank case 121. The installation surface of the oil filter 125 is formed with an inlet 164 which communicates with the oil pump 161 and an outlet 165 which communicates with the oil cooler 126. The inlet 164 of the oil filter 125 is formed below the center line and the outlet 165 of the oil filter 125 is formed on the center line. The installation surface of the oil cooler 126 is formed with an inlet 167 which communicates with the oil filter 125 and an outlet 168 which communicates with the main gallery 162. The inlet 167 of the oil cooler 126 is formed on the center line and the outlet 168 of the oil cooler 126 is formed above the center line.

Oil existing in the main gallery 162 is supplied to bearings 173a, 173b, and 173c of the front balancer shaft 151 through oil passages 172a, 172b, and 172c formed in right, central, and left journal walls 171a, 171b, and 171c (see FIG. 16) of the bottom case 128, respectively. Oil existing in the right bearing 173a of the front balancer shaft 151 is supplied to the sub-gallery 176 through an oil passage 175a which is formed in a right journal wall 174a (see FIG. 14A) of the top case 127. Oil existing in the sub-gallery 176 is supplied to piston jets 177 and used for cooling of the pistons 145 (see FIG. 11). Oil existing in the sub-gallery 176 is also supplied to a bearing 178 of a turboshaft (not shown) of a turbocharger.

Oil existing in the left bearing 173c of the front balancer shaft 151 is supplied to the cylinder head 112 through an oil passage 175c which is formed in a left journal wall 174c (see FIG. 15A) of the top case 127. Oil existing in the cylinder head 112 is supplied to a cam-tappet contact portion via inside a cam shaft (not shown) and lubricates it, and is then returned to the oil pan 122 via an oil return passage 185 and a cam chain room 193 which are formed in the top case 127 (see FIG. 13), and other things. In this manner, the lubrication path leading from the main gallery 162 to the sub-gallery 176 and the lubrication path leading from the main gallery 162 to the cylinder head 112 are formed separately in the crank case 121.

Oil existing in the main gallery 162 is also supplied to bearings 202a, 202b, and 202c of the crank shaft 141 through oil passages 201a, 201b, and 201c formed in the right, central, and left journal walls 171a, 171b, and 171c (see FIG. 16) of the bottom case 128, respectively. Oil existing in the right bearings 202a of the crank shaft 141 and oil existing in the central bearing 202b of the crank shaft 141 are supplied to bearings 203a and 204b of the bottom balancer shaft 154 through oil passages 203a and 203b of the journal walls 171a and 171b, respectively. Oil is supplied to the drive shaft 149 via an oil passage 205 which branches off from the oil passage 203a. Oil existing in the left bearing 202c of the crank shaft 141 is supplied to the counter shaft 147 through an oil groove formed in the journal wall 171c.

As described above, the lubrication paths leading from the main gallery 162 to the bearings 173a-173c of the front balancer shaft 151 and the lubrication paths leading from the main gallery 162 to the bearings 202a-202c of the crank shaft 141 are formed separately in the crank case 121. Oil is supplied to the sub-gallery 176 and the cylinder head 112 along the lubrication paths including the bearings 173a and 173c of the front balancer shaft 151, respectively. And oil is supplied to the bearings 204a and 204b of the bottom balancer shaft 154, the counter shaft 147, and the drive shaft 149 along the lubrication paths including the bearings 202a-202c of the crank shaft 141.

The engine lubrication structure according to the second aspect of the invention will be described below in detail. First, the lubrication path to the sub-gallery 176 will be described with reference to FIGS. 13 and 14. FIG. 13 is a front view of the crank case 121 according to the embodiment of the second aspect of the invention. FIGS. 14A, 14B, and 14C are sectional views, taken along lines A-A, B-B, and C-C in FIG. 13, respectively, of the crank case 121 according to the embodiment of the second aspect of the invention. For convenience of description, fastening bolts and the counter shaft 147 are omitted in FIG. 14A and the various shafts are omitted in FIGS. 14B and 14C.

As shown in FIGS. 13 and 14A, the crank case 121 is dividable in the vertical direction and is composed of the top case 127 and the bottom case 128. The balancer housing 129 is attached to the bottom of the bottom case 128 under the crank shaft 141. Common fastening bolts are inserted in the top case 127, the bottom case 128, and the balancer housing 129, whereby the top case 127 and the bottom case 128 are fastened to each other by the fastening bolts at the joining plane 134 and the bottom case 128 and the balancer housing 129 are fastened to each other by the fastening bolts at the joining plane 135. The front balancer shaft 151, the crank shaft 141, and the drive shaft 149 (see FIG. 11) are supported at the joining plane 134 of the top case 127 and the bottom case 128.

The counter shaft 147 (see FIG. 11) is supported by the side walls of the top case 127, and the bottom balancer shaft 154 is supported at the joining plane 135 of the bottom case 128 and the balancer housing 129. That is, in the crank case 121, the front balancer shaft 151 is disposed in front of the crank shaft 141 and the bottom balancer shaft 154 is disposed under the crank shaft 141. The counter shaft 147 and the drive shaft 149 are disposed in the rear of the crank shaft 141. The main gallery 162 for distributing, to the individual components of the engine 101, oil sent from the oil pump 161 (see FIG. 12) is formed in front of the bottom balancer shaft 154 in the bottom case 128 of the crank case 121.

The main gallery 162 is formed in bottom-front of the crank shaft 141 so as to avoid the bottom balancer shaft 154 which is located right under the crank shaft 141. The main gallery 162 is formed below the front balancer shaft 151 so as to extend straightly in the left-right direction of the bottom case 128 (i.e., perpendicularly to the paper surface of FIG. 14A). The sub-gallery 176 for supplying oil to individual components of the engine 101 is formed in top-front of the crank shaft 141. The sub-gallery 176 is formed above the front balancer shaft 151 parallel with the main gallery 162. With the above structure, the respective regions where the main gallery 162 and the sub-gallery 176 are formed in the crank case 121 can be made small and the crank case 121 can be miniaturized accordingly.

The oil passages 172a and 175a for supplying oil from the main gallery 162 to the sub-gallery 176 via the bearing 173a of the front balancer shaft 151 is formed in a right portion of the crank case 121. The oil passage 172a extends from the main gallery 162 to a placement surface 181, for the bearing 173a of the front balancer shaft 151, of the bottom case 128. The oil passage 175a extends from a placement surface 182, for the bearing 173a of the front balancer shaft 151, of the top case 127 to the sub-gallery 176. The placement surfaces 181 and 182 for the bearing 173a of the front balancer shaft 151 are formed with respective oil grooves 183 (see FIG. 16), which are oil passages that connect the oil passages 172a and 175a.

As mentioned above, the top case 127 and the bottom case 128 are fastened to each other strongly by the fastening bolts. Thus, the bearing 173a of the front balancer shaft 151 is set on the placement surface 181 of the bottom case 128 and the placement surface 182 of the top case 127 without forming a gap. Since the front balancer shaft 151 is housed in the front balancer room 186 (see FIG. 14B), even if oil leakage occurs there, the oil can be returned to the oil pan 122 (see FIG. 9). Since the oil passage includes the placement position of the bearing 173a, no sealing member such as an O-ring for preventing oil leakage is necessary unlike in a case that an oil passage for this purpose is formed so as to avoid the placement position of the bearing 173a, leading to reduction in the number of components.

In the crank case 121, the front balancer shaft 151 is located approximately on the straight line that connects the main gallery 162 and the sub-gallery 176. That is, the main gallery 162, the front balancer shaft 151, and the sub-gallery 176 are arranged in this order upward approximately in line. As a result, the oil passages 172a and 175a can be formed straightly and hence can be made short, whereby oil pressure reduction there can be suppressed. Furthermore, since each of the oil passages 172a and 175a can be formed in the top case 127 or the bottom case 128 by a single machining operation, the number of machining steps can be reduced.

Since high-pressure oil is supplied from the oil pump 161 (see FIG. 12) to the main gallery 162, high-pressure oil is supplied from the main gallery 162 to the bearing 173a of the front balancer shaft 151. As a result, a sufficiently thick oil film is formed on the bearing 173a of the front balancer shaft 151 which requires a high oil pressure, whereby seizing-up of the front balancer shaft 151 can be prevented. When oil is supplied to the bearing 173a of the front balancer shaft 151, the oil still has a sufficiently high pressure. To utilize this high oil pressure, oil that has passed the right bearing 173a of the front balancer shaft 151 is sent to the sub-gallery 176 while its sufficiently high pressure is maintained.

As shown in FIG. 14B, oil that has been sent to the sub-gallery 176 goes deep through the sub-gallery 176 and reaches the piston jets 177. The oil is jetted from the piston jets 177 toward the pistons 145 (see FIG. 11), whereby the pistons 145 are cooled. The oil pressure in the sub-gallery 176 is lowered by the supply of oil to the piston jets 177. However, since the lubrication path from the main gallery 162 to the sub-gallery 176 is different from that from the main gallery 162 to the bearing 202a of the crank shaft 141 (see FIG. 14A), the influence of the oil pressure reduction on the oil pressure at the bearing 202a of the crank shaft 141 due to the supply of oil to the piston jets 177 can be lessened.

As shown in FIG. 14C, oil that has been sent to the sub-gallery 176 goes deep (downstream) past the piston jets 177 (see FIG. 14B) and is supplied to the bearing 178 of the turboshaft (see FIG. 12) of the turbocharger (not shown) from a turbocharger inlet 179. In this manner, oil that has been used for lubrication of the bearing 173a of the front balancer shaft 151 is used again for cooling by the piston jets 177 and lubrication of the bearing 178 of the turboshaft. Furthermore, since the oil passages 172a and 175a are formed in the front walls of the bottom case 128 and the top case 127, respectively, the crank case 121 need not have useless solid portions for formation of independent oil passages corresponding to the oil passages 172a and 175a, leading to weight reduction of the crank case 121.

Figure 15A:
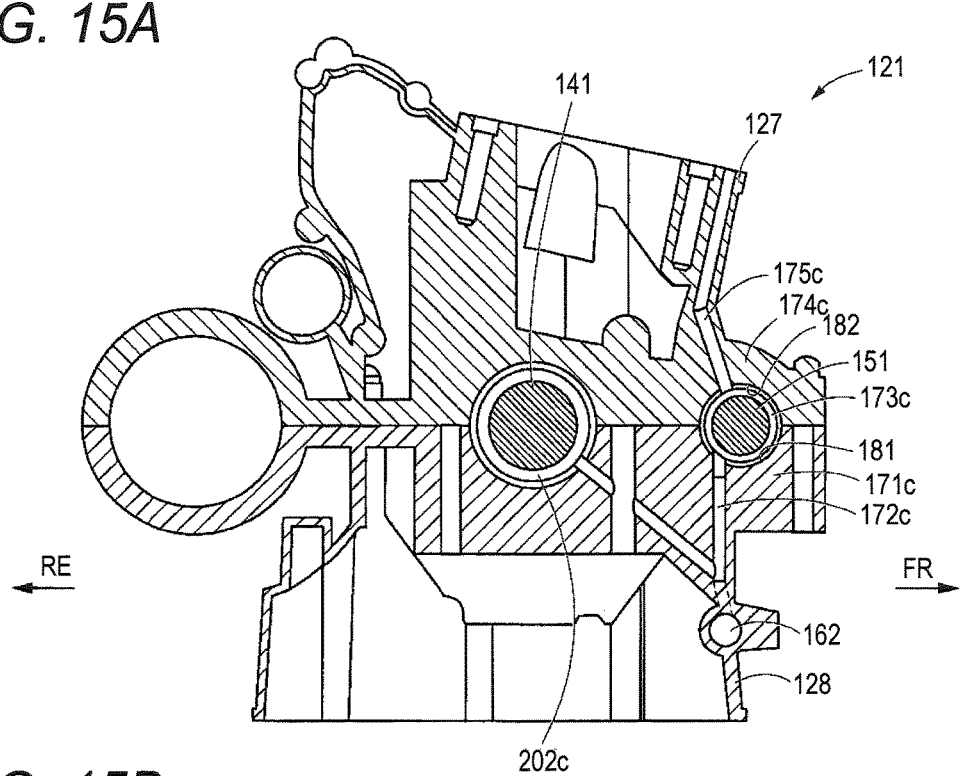
FIGS. 15A and 15B are another set of sectional views of the crank case according to the embodiment of the second aspect of the invention.
Figure 15B:
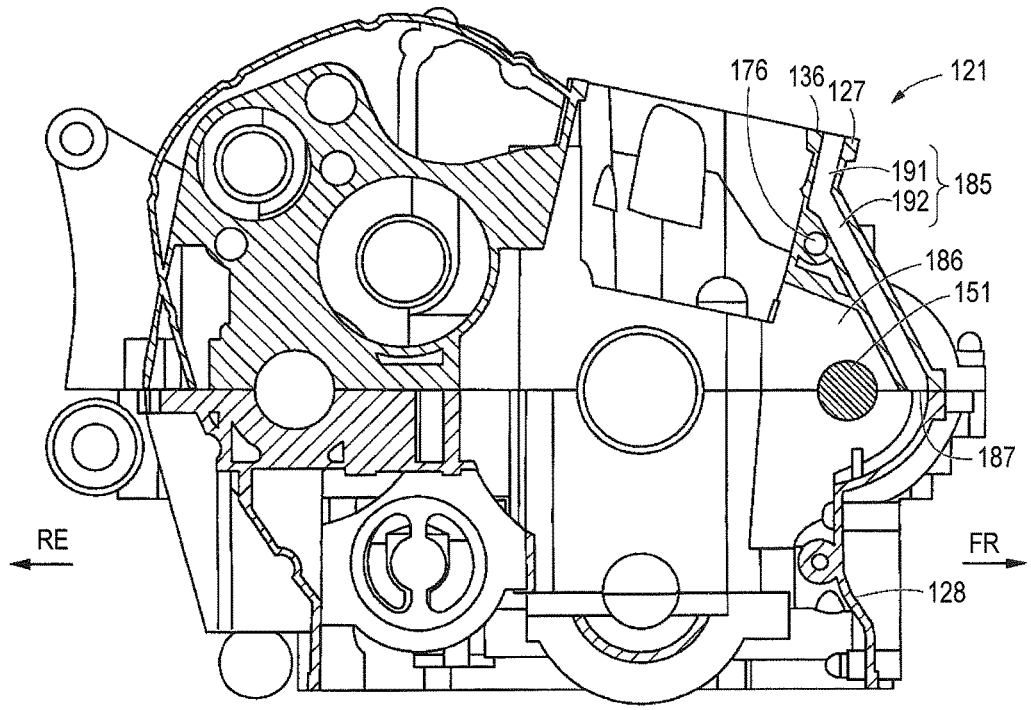

Next, the lubrication path to the cylinder head 112 will be described with reference to FIGS. 13, 15A and 15B, and 16. FIGS. 15A and 15B are sectional views, taken along lines D-D and E-E in FIG. 13, of the crank case 121 according to the embodiment of the second aspect of the invention. FIG. 16 is a perspective view of the top case 127 and the bottom case 128 of the crank case 121 according to the embodiment of the second aspect of the invention. For convenience of description, the shafts are omitted in FIG. 15B.

As shown in FIGS. 13 and 15A, the oil passages 172c and 175c for supplying oil from the main gallery 162 to the cylinder head 112 via the bearing 173c of the front balancer shaft 151 are formed in a left portion of the crank case 121. The oil passage 172c extends from the main gallery 162 to a placement surface 181, for the bearing 173c of the front balancer shaft 151, of the bottom case 128. The oil passage 175c extends from a placement surface 182, for the bearing 173c of the front balancer shaft 151, of the top case 127 toward the cylinder head 112 (see FIG. 9). The placement surfaces 181 and 182 for the bearing 173c of the front balancer shaft 151 are formed with respective oil grooves 183 (see FIG. 16), which are oil passages that connect the oil passages 172c and 175c.

Since the front balancer shaft 151 is housed in the front balancer room 186 (see FIG. 15B), even if oil leakage occurs there, the oil can be returned to the oil pan 122 (see FIG. 9).

Since the oil passage includes the placement position of the front balancer shaft 151 as in the case of the lubrication path to the sub-gallery 176, no sealing member such as an O-ring for preventing oil leakage is necessary unlike in a case that an oil passage for this purpose is formed so as to avoid the placement position of the bearing 173c, leading to reduction in the number of components. Furthermore, since the oil passages 172c and 175c are formed in the left walls of the bottom case 128 and the top case 127, respectively, the crank case 121 need not have useless solid portions for formation of independent oil passages corresponding to the oil passages 172c and 175c, leading to weight reduction of the crank case 121.

Since high-pressure oil is supplied from the oil pump 161 (see FIG. 12) to the main gallery 162, high-pressure oil is supplied from the main gallery 162 to the bearing 173c of the front balancer shaft 151. As a result, a sufficiently thick oil film is formed on the bearing 173c of the front balancer shaft 151 which requires a high oil pressure, whereby seizing-up of the front balancer shaft 151 can be prevented. When oil is supplied to the bearing 173c of the front balancer shaft 151, the oil still has a sufficiently high pressure. To utilize this high oil pressure, oil that has passed the left bearing 173c of the front balancer shaft 151 is sent to the cylinder head 112 while its sufficiently high pressure is maintained.

Oil that has been sent to the cylinder head 112 enters the inside of the cam shaft from its left end and lubricates the cam, the tappet, etc. as it receives centrifugal force. In this manner, oil that has been used for lubrication of the bearing 173c of the front balancer shaft 151 is used again for lubrication of the cylinder head 112. The oil pressure in each of the oil passages 172c and 175c is lowered by the supply of oil to the cylinder head 112. However, since the lubrication path from the main gallery 162 to the cylinder head 112 is different from that from the main gallery 162 to the bearing 202c of the crank shaft 141 (see FIG. 15A), the influence of the oil pressure reduction on the oil pressure at the bearing 202c of the crank shaft 141 due to the supply of oil to the cylinder head 112 can be lessened.

The oil passages 172a and 175a for supplying oil from the main gallery 162 to the sub-gallery 176 are formed on the right side in the crank case 121 (see FIG. 14A) and the oil passages 172c and 175c for supplying oil from the main gallery 162 to the cylinder head 112 are formed on the left side in the crank case 121 (see FIG. 15A). Thus, the oil pressure in the main gallery 162 can be distributed equally to the left side and the right side. Furthermore, since the set of oil passages 172a and 175a and the set of oil passages 172c and 175c are distant from each other in the left-right direction, oil pressure reduction due to the supply of oil to the piston jets 177 does not affect the oil pressure in the cylinder head 112. Likewise, oil pressure reduction due to the supply of oil to the cylinder head 112 does not affect the oil pressure in the sub-gallery 176.

As shown in FIG. 15B, the oil return passage 185 for returning oil from the cylinder head 112 (see FIG. 9) to inside the crank case 121 is formed in a right portion of the crank case 121. That is, in the crank case 121, oil is returned from the cylinder head 112 on the opposite side to the oil passages 172c and 175c in the left-right direction. In the crank case 121, an outlet 187 of the oil return passage 185 is connected to the front balancer room 186 which houses the front balancer shaft 151. In the front balancer room 186, the outlet 187 of the oil return passage 185 is located in front of the front balancer shaft 151 on the right side in the crank case 121.

With the outlet 187 located at this position, return oil can be put out of the oil return passage 185 at the position that is most distant from the front balancer shaft 151. Return oil that is put out of the outlet 187 of the oil return passage 185 flows down an inner wall surface, in the front balancer room 186, of the crank case 121 and hence does not come into contact with any rotary components such as a balancer weight of the front balancer shaft 151. As a result, the probability of occurrence of oil mist in the front balancer room 186, and hence mixing of oil mist into blowby gas, can be lowered. Furthermore, since return oil does not come into contact with any rotary components, return oil from the cylinder head 112 can be returned to the oil pan 122 quickly.

The oil return passage 185 is composed of a vertical passage 191 which extends downward from the joining plane 136 of the crank case 121 and the cylinder assembly 110 and a slant passage 192 which extends obliquely from the bottom end of the vertical passage 191 so as reach a front portion of the crank case 121. The slant passage 192 is inclined so as to extend vertically when the crank case 121 (engine 101) is mounted in the vehicle. That is, the inclination of the slant passage 192 is determined taking a mounting angle of the crank case 121 into consideration. This makes it possible to return return oil to the oil pan 122 quickly. The term "vertically" used herein is not limited to the case that the slant passage 192 extends completely vertically and encompasses a case that it extends approximately vertically.

Since the oil return passage 185 is formed in the front walls of the cylinder assembly 110 (see FIG. 9) and the top case 127, the crank case 121 need not have useless solid portions for formation of an independent oil passage corresponding to the oil return passage 185, leading to weight reduction of the crank case 121. In this connection, the oil return passage 185 runs in front of the sub-gallery 176 in the crank case 121. Since the oil return passage 185 is formed in a dead region, where the sub-gallery 176 is formed, of the front wall of the crank case 121, leading to further weight reduction of the crank case 121.

As shown in FIG. 16, the cam chain room 193 for housing of a cam chain (not shown) is formed in a left portion of the crank case 121. Since the cam chain room 193 is formed on the side opposite to the oil return passage 185 in the left-right direction in the crank case 121, the amount of oil that flows into the cam chain room 193 can be reduced. As a result, return oil comes into contact with the cam chain less frequently and hence the probability of occurrence of oil mist in the cam chain room 193 can be lowered. Furthermore, since return oil is returned to the oil pan 122 efficiently through the oil return passage 185 and the cam chain room 193 from both sides, in the left-right direction, of the cylinder head 112, staying of oil in the cylinder head 112 can be prevented.

As described above, as shown in FIG. 16, the oil passages 172c and 175c are formed on the left side in the crank case 121 and the oil return passage 185 is formed on the right side in the crank case 121. Thus, the lubrication path is formed in which oil is supplied to the cam shaft from the left side of the cylinder head 112 and returned to the crank case 121 from the right side of the crank case 121. Furthermore, since the oil return passage 185 is formed between the oil passages 172a and 175a and the oil passages 172c and 175c, the left-right width of the crank case 121 can be shortened.

As described above, according to the embodiment, high-pressure oil is supplied from the oil pump 161 to the main gallery 162 and high-pressure oil is also supplied from the main gallery 162 to the bearings 173a-173c of the front balancer shaft 151. As a result, the front balancer shaft 151 is supported by the bearings 173a-173c rotatably via oil films, whereby seizing-up of the front balancer shaft 151 can be prevented. Since high-pressure oil is supplied to the sub-gallery 176 via the bearing 173a of the front balancer shaft 151, the oil coming from the sub-gallery 176 can be reused for lubrication of several components of the engine 101. Furthermore, since the same oil passages 172a and 175a are used for supplying oil from the main gallery 162 to the bearing 173a of the front balancer shaft 151 and the sub-gallery 176, no independent oil passages for these purposes need to be formed in the crank case 121. As a result, no independent pipes need to be provided, the weight or the number of machining steps is not increased, and the oil passages can be shortened.

The second aspect of the invention is not limited to the above embodiment and can be practiced by modifying it in various manners. The second aspect of invention is not limited to the sizes, shapes, etc. shown in the accompanying drawings and they can be modified as appropriate within the confines that the advantages of the second aspect of the invention can be obtained. Other modifications can also be made as appropriate as long as the related object of the invention is attained.

For example, although in the embodiment of the second aspect of the invention oil is supplied from the sub-gallery 176 to the piston jets 177 and the bearing 178 of the turboshaft, the second aspect of the invention is not limited to this structure. It suffices that the sub-gallery 176 supply, to several components of the engine 101, oil received via the bearing 173a of the front balancer shaft 151. For example, the sub-gallery 176 may supply oil to the cylinder head 112. In this case, the oil passages 172c and 175c may not be formed in the crank case 121.

In the embodiment of the second aspect of the invention, the oil passages 172a and 175a for supplying oil from the main gallery 162 to the sub-gallery 176 are formed on the right side in the crank case 121 and the oil passages 172c and 175c for supplying oil from the main gallery 162 to the cylinder head 112 are formed on the left side in the crank case 121. However, the second aspect of the invention is not limited to this structure; a structure is possible in which the oil passages 172a and 175a for supplying oil from the main gallery 162 to the sub-gallery 176 are formed on the left side in the crank case 121 and the oil passages 172c and 175c for supplying oil from the main gallery 162 to the cylinder head 112 are formed on the right side in the crank case 121. Furthermore, the second aspect of the invention is not limited to the structure in which the oil passages 172a and 175a are formed in an end portion of the crank case 121; for example, the oil passages 172a and 175a may be formed in a middle portion, in the left-right direction, of the crank case 121.

Although in the embodiment of the second aspect of the invention the front balancer shaft 151 and the bottom balancer shaft 154 are disposed in the crank case 121, the second aspect of the invention is not limited to this structure. It suffices that at least one balancer shaft be disposed in the crank case 121; for example, one balancer shaft may be disposed in the rear of the crank shaft 141.

Although in the embodiment of the second aspect of the invention the front balancer shaft 151 is disposed at the joining plane of the top case 127 and the bottom case 128, the second aspect of the invention is not limited to this structure. The front balancer shaft 151 may be disposed in either of the top case 127 or the bottom case 128.

Although in the embodiment of the second aspect of the invention the crank case 121 is composed of the top case 127 and the bottom case 128, the second aspect of the invention is not limited to this structure. The crank case 121 may be dividable in the horizontal direction and be composed of a left case and a right case.

Although in the embodiment of the second aspect of the invention the sub-gallery 176 extends parallel with the main gallery 162, the second aspect of the invention is not limited to this structure. The main gallery 162 and the sub-gallery 176 need not always be formed parallel with each other. Although in the embodiment the main gallery 162 and the sub-gallery 176 are straight, the second aspect of the invention is not limited to this structure. The shapes of the main gallery 162 and the sub-gallery 176 may be changed as appropriate according to the shape of the crank case 121.

Although in the embodiment of the second aspect of the invention oil is caused to pass the bearing 173a of the front balancer shaft 151 by forming the oil grooves 183 which are formed in the bearing placement surfaces 181 and 182 of the right journal walls 171a and 174a, the second aspect of the invention is not limited to this structure. It suffices to cause oil to pass the bearing 173a of the front balancer shaft 151. For example, the bearing 173a or the front balancer shaft 151 may be formed with an oil groove.

Providing the above-described advantage that oil passages can be shortened without causing increase in weight or the number of machining steps and high-pressure oil that is supplied from the main gallery can be utilized effectively, the second aspect of the invention is particularly useful when applied to engine lubrication structures of motorcycles.

What is claimed is:

1. An engine lubrication structure which supplies oil from an oil pump to individual components of an engine in which a balancer shaft is disposed parallel with a crank shaft in a crank case, wherein:
   the engine comprises a turbocharger which compresses intake air using exhaust gas of the engine;
   a main gallery which supplies oil to a bearing of the crank shaft via a first oil passage and supplies oil to a bearing of the balancer shaft via a second oil passage, and a sub-gallery which supplies the oil flowing past the bearing of the balancer shaft and supplied to the sub-gallery via a third oil passage connecting the bearing of the balancer shaft and the sub-gallery to individual components of the engine via a fourth oil passage shaft are provided in the crank case; and
   a fifth oil passage which supplies oil to the turbocharger is connected to the sub-gallery.

2. The engine lubrication structure according to claim 1, wherein the sub-gallery is provided with a piston jet which jets oil toward a piston.

3. The engine lubrication structure according to claim 1, wherein:
   the balancer shaft is disposed below the sub-gallery; and
   the main gallery is disposed below the balancer shaft.

4. The engine lubrication structure according to claim 1, wherein:
   an oil return passage which returns oil that has been supplied to the turbocharger to the crank case is connected to the crank case;
   the balancer shaft is disposed in front of the crank shaft; and
   the oil return passage is connected to a wall of a balancer room which houses the balancer shaft.

5. A motorcycle comprising the engine lubrication structure according to claim 1.

* * * * *